(12) United States Patent
Pyzer-Knapp et al.

(10) Patent No.: US 12,468,977 B2
(45) Date of Patent: Nov. 11, 2025

(54) UNCERTAINTY AWARE PARAMETER PROVISION FOR A VARIATIONAL QUANTUM ALGORITHM

(71) Applicant: International Business Machines Corporation, Armonk, NY (US)

(72) Inventors: Edward Oliver Pyzer-Knapp, Runcorn (GB); Mario Motta, San Jose, CA (US); Michael Johnston, Dublin (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1096 days.

(21) Appl. No.: 17/378,437

(22) Filed: Jul. 16, 2021

(65) Prior Publication Data

US 2023/0012699 A1    Jan. 19, 2023

(51) Int. Cl.
  *G06N 20/00*    (2019.01)
  *G06N 10/00*    (2022.01)
(52) U.S. Cl.
  CPC .............. *G06N 20/00* (2019.01); *G06N 10/00* (2019.01)
(58) Field of Classification Search
  CPC ............................ G06N 20/00; G06N 10/00
  USPC ........................................................ 706/12
  See application file for complete search history.

(56) References Cited

U.S. PATENT DOCUMENTS

| | | | |
|---|---|---|---|
| 10,325,218 B1 * | 6/2019 | Zeng | G06N 10/00 |
| 10,452,989 B2 | 10/2019 | Majumdar | |
| 10,587,277 B2 | 3/2020 | Hincks et al. | |
| 10,789,541 B2 | 9/2020 | Mohseni et al. | |
| 2014/0187427 A1 * | 7/2014 | Macready | G06N 7/01 706/46 |
| 2018/0096085 A1 | 4/2018 | Rubin | |
| 2019/0130256 A1 * | 5/2019 | Ghahramani | G06N 20/10 |
| 2020/0104740 A1 | 4/2020 | Cao | |

(Continued)

FOREIGN PATENT DOCUMENTS

| | | |
|---|---|---|
| EP | 3520041 A1 | 8/2019 |
| WO | 2020142122 A3 | 7/2020 |

OTHER PUBLICATIONS

Chen et al., "Closed-Loop and Robust Control of Quantum Systems", the Scientific World Journal, vol. 2013, Article ID 869285, Aug. 2013. (Year: 2013).*

(Continued)

*Primary Examiner* — Hwei-Min Lu
(74) *Attorney, Agent, or Firm* — Amin, Turocy & Watson, LLP

(57) ABSTRACT

Systems, computer-implemented methods and/or computer program products that can facilitate providing a defined parameter, determining whether to employ the defined parameter for a variational quantum algorithm, and running the variational quantum algorithm on a quantum system, are provided. According to an embodiment, a system can comprise a memory that stores computer executable components and a processor that executes the computer executable components stored in the memory. The computer executable components can comprise a decision component that determines, based upon an uncertainty prediction regarding the usability of the defined parameter that has been output from a machine learning model, whether to employ the defined parameter in a variational quantum algorithm, such as run on a quantum system.

19 Claims, 10 Drawing Sheets

(56) References Cited

U.S. PATENT DOCUMENTS

| | | | |
|---|---|---|---|
| 2020/0286595 A1 | 9/2020 | Neukart et al. | |
| 2020/0349457 A1 | 11/2020 | Low et al. | |
| 2020/0394537 A1* | 12/2020 | Wang | G06N 5/04 |
| 2021/0157877 A1* | 5/2021 | Mezzacapo | G06F 17/16 |
| 2021/0279631 A1* | 9/2021 | Pichler | G06N 10/60 |

OTHER PUBLICATIONS

Koswara et al., "Robustness of Controlled Quantum Dynamics", arXiv ID: 1409.8096, Sep. 29, 2014. (Year: 2014).*
Cerezo et al., "Variational Quantum Algorithms", arXiv ID: 2012.09265, Dec. 16, 2020. (Year: 2020).*
Koswara et al., "Robust Control of Quantum Dynamics under Input and Parameter Uncertainty", arXiv ID: 2102.11813. Feb. 23, 2021. (Year: 2021).*
Dong et al., "Robust Control Optimization for Quantum Approximate Optimization Algorithm", arXiv: 1911.00789, Nov. 2, 2019. (Year: 2019).*
Westermann et al., "Using Bayesian deep learning approaches for uncertainty-aware building energy surrogate models", arXiv: 2010.030329, Oct. 5, 2020. (Year: 2020).*
Bakthavatchalam et al., "Bayesian Optimization of Bose-Einstein Condensates", Scientific Reports, 11, 5054, Mar. 3, 2021. (Year: 2021).*
Chen et al., "Closed-Loop and Robust Control of Quantum Systems", the Scientific World Journal, vol. 2013, Article ID 869285, Aug. 2013, pp. 1-11. (Year: 2013).*
Koswara et al., "Robustness of Controlled Quantum Dynamics", arXiv ID: 1409.8096, Sep. 29, 2014, pp. 1-15. (Year: 2014).*
Wu et al., "Robust Quantum Operation for Two-Level Systems Using Sampling-Based Learning Control", 2015 IEEE International Conference on Systems, Man, and Cybernetics, Oct. 2015, pp. 2043-2048. (Year: 2015).*
Dong et al., "Robust Control Optimization for Quantum Approximate Optimization Algorithm", arXiv ID: 1911.00789, Nov. 2, 2019, pp. 1-8. (Year: 2019).*
Westermann et al., "Using Bayesian deep learning approaches for uncertainty-aware building energy surrogate models", arXiv ID: 2010.030329, Oct. 5, 2020, pp. 1-46. (Year: 2020).*
Dangwal et al., "An Algorithm for Fast Supervised Learning in Variational Circuits through Simultaneous Processing of Multiple Samples", arXiv ID: 2011.14297, Nov. 29, 2020, pp. 1-9. (Year: 2020).*
Cerezo et al., "Variational Quantum Algorithms", arXiv ID: 2012.09265, Dec. 16, 2020, pp. 1-29. (Year: 2020).*
Koswara et al., "Robust Control of Quantum Dynamics under Input and Parameter Uncertainty", arXiv ID: 2102.11813. Feb. 23, 2021, pp. 1-19. (Year: 2021).*
Bakthavatchalam et al., "Bayesian Optimization of Bose-Einstein Condensates", Scientific Reports, 11, 5054, Mar. 3, 2021, pp. 1-9. (Year: 2021).*
Magann et al, "Feedback-based quantum optimization", arXiv ID: 2103.08619, Mar. 15, 2021, pp. 1-8. (Year: 2021).*
Fontalvo, "Variational quantum information processing," Doctoral dissertation, Harvard University, Graduate School of Arts & Sciences, Jan. 20, 2019, 281 pages.
Peruzzo et al., "A variational eigenvalue solver on a quantum processor," arXiv:1304.3061v1 [quant-ph].
Grimsley et al., "An adaptive variational algorithm for exact molecular simulations on a quantum computer," arXiv:1812.11173v2 [quant-ph] Jul. 13, 2019, 11 pages.
Benedetti et al., "Parameterized quantum circuits as machine learning models," arXiv:1906.07682v2 [quant-ph] Oct. 10, 2019, 18 pages.
Mitarai et al., "Generalization of the Output of a Variational Quantum Eigensolver by Parameter Interpolation with a Low-depth Ansatz," Physical Review Applied 11, 044087 (2019), 9 pages.
Romero et al., "Strategies for quantum computing molecular energies using the unitary coupled cluster ansatz," 2019 Quantum Sci. Technol. 4 014008, 19 pages.
Parrish et al., "Hybrid Quantum/Classical Derivative Theory: Analytical Gradients and Excited-State Dynamics for the Multistate Contracted Variational Quantum Eigensolver," arXiv:1906.08728v1 [quant-ph] Jun. 20, 2019, 26 pages.
Higgott et al., "Variational Quantum Computation of Excited States," arXiv:1805.08138v5 [quant-ph] Jun. 28, 2019, 11 pages.
Sun et al., "Quantum Computation of Finite-Temperature Static and Dynamical Properties of Spin Systems Using Quantum Imaginary Time Evolution," arXiv:2009.03542v1 [quant-ph] Sep. 8, 2020, 14 pages.
O'Brien et al., "Calculating energy derivatives for quantum chemistry on a quantum computer," npj Quantum Information vol. 5, Article No. 113 (2019), 12 pages.
Mell et al., "The NIST Definition of Cloud Computing," Recommendations of the National Institute of Standards and Technology, NIST Special Publication 800-145, Sep. 2011, 7 pages.

* cited by examiner

UNCERTAINTY AWARE PARAMETER PROVISION FOR A VARIATIONAL QUANTUM ALGORITHM

BACKGROUND

One or more embodiments herein relate generally to providing a defined parameter for a variational quantum algorithm and more specifically, to also determining whether to employ the defined parameter for the variational quantum algorithm and providing subsequent related instruction regarding supplementary parameter optimization.

SUMMARY

The following presents a summary to provide a basic understanding of one or more embodiments described herein. This summary is not intended to identify key or critical elements, or to delineate any scope of the particular embodiments or any scope of the claims. The sole purpose of the summary is to present concepts in a simplified form as a prelude to the more detailed description that is presented later. In one or more embodiments described herein, devices, systems, computer-implemented methods, apparatus and/or computer program products are described that can facilitate providing a defined parameter, determining whether to employ the defined parameter for a variational quantum algorithm, and operating the variational quantum algorithm on one or more qubits on a quantum system.

According to an embodiment, a system can comprise a memory that stores computer executable components and a processor that executes the computer executable components stored in the memory. The computer executable components can comprise a decision component that determines, based upon an uncertainty prediction regarding the usability of a defined parameter that has been output from a machine learning model, whether to employ the defined parameter for running a variational quantum algorithm.

According to another embodiment, a computer-implemented method can comprise determining, by a system operatively coupled to a processor, and based upon an uncertainty prediction regarding the usability of a defined parameter that has been output from a machine learning model, whether to employ the defined parameter for running a variational quantum algorithm.

According to yet another embodiment, a computer program product facilitating providing a defined parameter and determining whether to employ the defined parameter for a variational quantum algorithm, can comprise a computer readable storage medium having program instructions embodied therewith. The program instructions can be executable by a processor to determine, by the processor, and based upon an uncertainty prediction regarding the usability of the defined parameter that has been output from a machine learning model, whether to employ the defined parameter for running a variational quantum algorithm.

DETAILED DESCRIPTION

Figure 1:
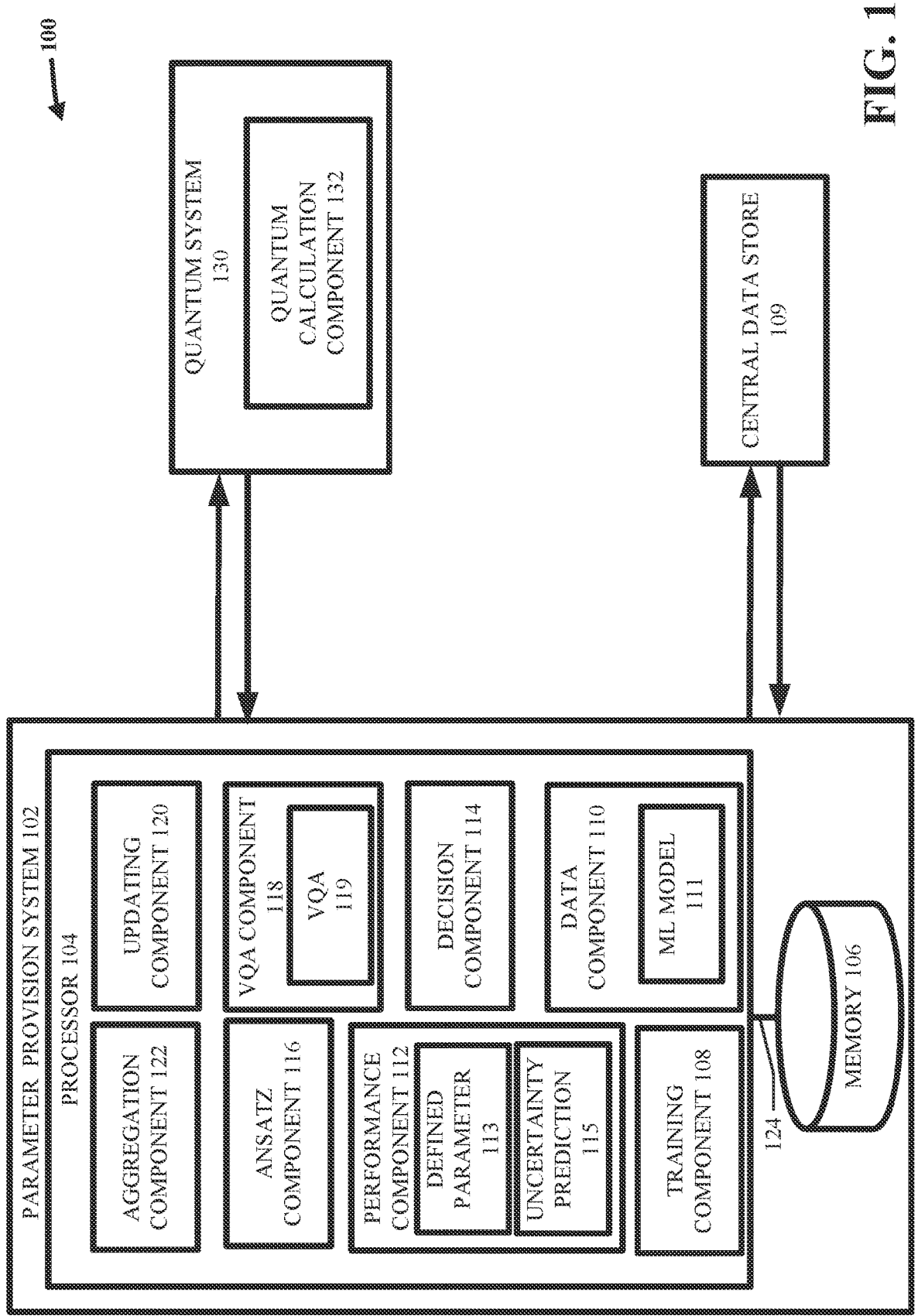
FIG. 1 illustrates a block diagram of an example, non-limiting system that can facilitate providing a defined parameter, determining whether to employ the defined parameter for a variational quantum algorithm, and operating the variational quantum algorithm on one or more qubits on a quantum system, in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in this Detailed Description section.

Quantum algorithms are those that employ a quantum system, such as a quantum computer or other quantum device, to attempt to solve a problem, such as of an optimization nature. One type of quantum algorithm, a variational quantum algorithm, relies on one or more parameterized quantum circuits, yielding one or more parameterized wavefunctions. The variational quantum algorithm, or VQA, employs an optimizer, such as a classical optimizer, to train the one or more parameterized quantum circuits for the purpose of approximating one or more answers to one or more given problems. A parameterized quantum circuit is one that comprises one or more gates having parameters that allow for fine-tuning of an effect of implementing the parameterized quantum circuit. The parameterized quantum circuit can be operated on one or more qubits on the quantum system. The parameters are employed to compile one or more particular waves and/or pulses, for example, for affecting the state of one or more of the qubits on the quantum system.

Employing suitable, e.g., optimal, parameters when running a VQA can maximize the VQA's cost function. That is, employing optimal parameters can lower the cost of the solution provided, such as in terms of any one or more of energy, time and/or fidelity, thus making the VQA efficient and reducing errors during implementation of the VQA. What makes a parameter respectively optimal can be dependent on the particular VQA to be run, such as a parameter being a low energy parameter or a low fidelity parameter.

For example, a goal of one type of VQA, can be to maximize a cost function in terms of energy. A goal of another type of VQA can be to facilitate approximation of the action of a first quantum circuit over a given wave function based upon the action of a second quantum circuit over the given wave function. In one or more cases, the second quantum circuit can be shallow, parameter dependent and/or hardware-efficient. The approximation of the action of the first quantum circuit can be accomplished by maximizing fidelity between states of the first and second quantum circuits.

Some examples of VQAs can include a quantum approximate optimization algorithm (QAOA), a variational quantum eigensolver (VQE), a variational quantum simulation of time evolution (VarITE), a variational quantum deflation (VQD), and algorithms for classically assisted quantum circuit simplification. The QAOA and VQE can be concerned with minimizing the energy of a quantum state. The VQD can be concerned with the sum of the energy of a quantum state and its overlap with the ground state of the system. The VarITE can produce curves in the parameter space to minimize the expectation value of an actual function and thus can approximates real- or imaginary-time evolution. Algorithms for classically assisted quantum circuit simplification can maximize the fidelity between a target quantum state and the output of the quantum circuit.

Embodiments of one or more systems, computer-implemented methods, apparatuses and/or computer program products described herein can enable the maximizing of a cost function for a VQA, such as via facilitating the initial determination, optimization, testing, and in one or more cases, further optimization and testing, of one or more parameters, i.e., variational quantum parameters. The parameters can define, such as being proportional to an integral of a curve of, an electromagnetic pulse sent to qubits in the associated quantum system. Parameters can be optimized classically, external to the one or more quantum systems employed for implementing the VQA. Accordingly, one or more systems described herein can include both a classical system and a quantum system, thereby being a hybrid system.

Via the one or more embodiments described herein, initial values for the parameters for employing a VQA can be determined at least partially manually, such as by combining physical intuition and mathematical arguments, and/or through use of an Ansatz method. These parameters can be optimized using a classical algorithm, such as a gradient descent, including evaluation of the respective cost function or other suitable operator, and in one or more cases, first and/or second derivatives thereof. The parameters can be tested on a quantum system, such as a quantum computer, to determine whether they are suitable, e.g., optimal, for use in running the VQA on the quantum system.

This process, however, can be undesirably costly in terms of time and energy and can take days, weeks or even months to provide one or more parameters that are optimal for running the VQA. That is, this optimization procedure can be unacceptably expensive, in terms of one or more of energy, time and fidelity, and generally can represent a computational bottleneck in the implementation of a VQA.

In one example, quantum computing cloud service providers can execute millions of quantum-related jobs for one or more entities during a given time period, such as a year. As used herein, an "entity" can refer to a machine, device, component, hardware, software, smart device or human. This can create pressure to execute respective quantum programs quickly, for example, to maximize system usage and/or to minimize compiling time to compile quantum programs. This in turn can result in entities having to wait for the compiling to be completed and can undesirably consume classical computational resources that could be otherwise employed. Furthermore, pressure can be created to execute these jobs well, such that the most performance can be extracted from near-term error-prone systems and/or such that the quality of compiling into physical-level pulses, e.g., electromagnetic pulses, can be improved.

Because of the high computational cost of parameter provision (including initial determination and/or one or more optimization iterations), and/or in view of the growing presence of VQAs in contemporary quantum computing, one or more embodiments described herein can facilitate bypassing and/or accelerating parameter optimization. That is, one or more embodiments described herein can include one or more systems, computer-implemented methods, apparatuses and/or computer program products that can facilitate providing a defined parameter, determining whether to employ the defined parameter for a variational quantum algorithm, and operating the variational quantum algorithm on one or more qubits on a quantum system.

For example, the one or more systems, computer-implemented methods and/or computer program products can facilitate: determination of a parameter; determination of usability of the defined parameter; use of the defined parameter in a VQA where an uncertainty meets one or more uncertainty levels; optimization of the defined parameter for supplying a resultant supplementary parameter where the uncertainty meets one or more uncertainty levels but does not meet one or more other uncertainty levels; non-use of the parameter in the VQA where the uncertainty does not meet one or more uncertainty levels; and/or determination and/or optimization of the defined parameter or a supplementary parameter employing an Ansatz-based optimization method.

These processes can provide increased efficiency and scaled parameter optimization and/or implementation of quantum algorithms. Further, the one or more systems, computer-implemented methods, apparatuses and/or computer program products can facilitate updating of a central data store with the defined parameter and/or the related uncertainty level and/or updating of the central data store from a plurality of systems being distributed relative to one another. These updating processes can in turn enable better training of associated machine learning models for subsequent parameter provision, thereby facilitating faster future parameter provision and further increased scaling where the central data store continues to be updated.

One or more of the aforementioned embodiments are now described with reference to the figures, where like referenced numerals are used to refer to like elements throughout. In the following description, for purposes of explanation, one or more specific details are set forth in order to provide a more thorough understanding of the one or more embodiments. It is evident in one or more cases, however, that the one or more embodiments can be practiced without these specific details.

Further, it should be appreciated that the embodiments depicted in one or more figures disclosed herein are for illustration only, and as such, the architecture of embodiments is not limited to the systems, devices and/or components depicted therein, nor to any particular order, connection and/or coupling of systems, devices and/or components depicted therein. For example, in one or more embodiments, the non-limiting system 100 and/or the parameter provision system 102 can further comprise one or more computer and/or computing-based elements described herein with reference to an operating environment 800 illustrated at FIG. 8. In several described embodiments, computer and/or computing-based elements can be used in connection with implementing one or more of the systems, devices, components and/or computer-implemented operations shown and described in connection with FIG. 1 or with other figures disclosed herein.

Turning now in particular first to FIG. 1, the figure illustrates a block diagram of an example, non-limiting system 100. Generally, the non-limiting system 100 can provide an optimal parameter for implementing a VQA on one or more qubits on a quantum system, and/or can achieve and/or attempt to achieve an objective of a VQA based at least in part on the provision of the optimal parameter.

The non-limiting system 100 can comprise a parameter provision system 102 that can facilitate providing a defined parameter and determining whether to employ the defined parameter for a variational quantum algorithm and/or related processes, in accordance with one or more embodiments described herein. Parameter provision system 102 can comprise any type of component, machine, device, facility, apparatus and/or instrument that comprises a processor and/or can be capable of effective and/or operative communication with a wired and/or wireless network. All such embodiments are envisioned. For example, parameter provision system 102 can comprise a server device, computing device, general-purpose computer, special-purpose computer, quantum computing device (e.g., a quantum computer), tablet computing device, handheld device, server class computing machine and/or database, laptop computer, notebook computer, desktop computer, cell phone, smart phone, consumer appliance and/or instrumentation, industrial and/or commercial device, digital assistant, multimedia Internet enabled phone, multimedia players and/or another type of device.

In one or more embodiments, the parameter provision system 102 can comprise a processor 104 (e.g., computer processing unit, microprocessor, classical processor, quantum processor and/or like processor). In one or more embodiments, any component associated with parameter provision system 102, as described herein with or without reference to the one or more figures of the one or more embodiments, can comprise one or more computer and/or machine readable, writable and/or executable components and/or instructions that can be executed by processor 104 to facilitate performance of one or more operations defined by such component(s) and/or instruction(s).

In one or more embodiments, the parameter provision system 102 can comprise a computer-readable memory 106 that is operably connected to the processor 104. The memory 106 can store computer-executable instructions that, upon execution by the processor 104, can cause the processor 104 and/or other components of the parameter provision system 102 (e.g., training component 108, data component 110, performance component 112, decision component 114, Ansatz component 116, VQA component 118, updating component 120 and/or aggregation component 122) to perform one or more acts. In one or more embodiments, the memory 106 can store computer-executable components (e.g., training component 108, data component 110, performance component 112, decision component 114, Ansatz component 116, VQA component 118, updating component 120 and/or aggregation component 122).

Parameter provision system 102 and/or a component thereof as described herein can be communicatively, electrically, operatively, optically and/or otherwise coupled to one another via a bus 124 to perform functions of non-limiting system 100, parameter provision system 102 and/or any components thereof. Bus 124 can comprise one or more of a memory bus, memory controller, peripheral bus, external bus, local bus, quantum bus and/or another type of bus that can employ one or more bus architectures. One or more of these examples of bus 124 can be employed to implement any one or more embodiments described herein.

In one or more embodiments, parameter provision system 102 can be coupled (e.g., communicatively, electrically, operatively, optically and/or like function) to one or more external systems, sources and/or devices (e.g., classical and/or quantum computing devices, communication devices and/or like devices), such as via a network.

Turning now to detailed explanations of one or more components illustrated at FIG. 1, functionality of the parameter provision system 102 will be described in detail. The following description(s) refer(s) to the provision of a single parameter, i.e. variational quantum parameter. However, it will be appreciated that one or more of the processes described herein can be scalable. For example, as will be appreciated below, the performance component 112 and/or the decision component 114 can provide one or more parameters and/or one or more associated decisions regarding the parameter subsequently and/or concurrently relative to one another.

Generally, the parameter provision system 102 can facilitate the uncertainty aware provision of a parameter for use in a VQA, such as in initialization of the VQA on a quantum system, such as the quantum system 130. This parameter provision can be uncertainty aware, such as where one or more predictions regarding the usability of the defined parameter also can be provided. In one instance, the usability can be related to low energy such that an ideal parameter is an increasingly low energy parameter as compared to previously defined parameters. In another instance, the usability can be related to low fidelity. Generally, where a threshold of usability is met, the parameter provision system 102 can make a decision to bypass parameter optimization, such as via an optimization portion 202 of the non-limiting system 100 (FIG. 2), or to utilize the defined parameter as an initial parameter for supplementary, but accelerated, parameter optimization, also such as via the optimization portion 202 and/or similar. Further, by providing parameters having high usability, such as being low energy or low fidelity parameters, the VQA can be run more efficiently, using less energy and/or time, for example, and thus resulting in respectively reduced error during operation on one or more qubits of a quantum system. Additionally, through the use of fewer resources for optimizing parameter values for subsequent VQA operations, the non-limiting system 100 can increase the throughput of the non-limiting system 100.

In addition to the processor 104 and/or memory 106 described above, parameter provision system 102 can comprise one or more computer and/or machine readable, writable and/or executable components and/or instructions that, when executed by processor 104, can facilitate performance of one or more operations defined by such component(s) and/or instruction(s). In one or more embodiments, parameter provision system 102 can comprise a training component 108, data component 110, performance component 112, decision component 114, Ansatz component 116, VQA component 118, updating component 120 and/or aggregation component 122. In one or more instances, such as described in detail below, parameter provision system 102 can facilitate via processor 104 (e.g., a classical processor, a quantum processor and/or like processor): training a machine learning model; executing the machine learning model to provide an uncertainty prediction and a parameter; employing an Ansatz-based optimization method to optimize a parameter; determining, based upon the uncertainty prediction, whether to employ the defined parameter in a VQA; and/or operating the variational quantum algorithm employing the defined parameter.

For example, the parameter provision system 102 can comprise a training component 108. Before initialization of the variational quantum algorithm (VQA) 119 on a quantum system 130, such as a quantum computer, data related to the VQA 119 can be pulled from one or more respective databases, such as the central data store 109. The data pulled can include historical data regarding previous iterations of running the VQA 119, previous parameters utilized, previous uncertainty predictions and/or the like. The central data store 109 can be any suitable database for storing data and can be directly or indirectly communicatively connected to the parameter provision system 102. In one or more instances, the central data store 109 can be accessible via a network, such as the cloud. In one or more instances, data can be otherwise received by the training component 108.

Upon obtaining the aforementioned data, the training component 108 can train a machine learning (ML) model 111 with respect to the aforementioned data for providing the defined parameter 113. It will be appreciated that the ML model 111 can be one of a plurality of ML models that can be formulated for facilitating parameter provision for a variational quantum algorithm.

The ML model 111 can be AI-supported through, for example, but not limited to, automated hyperparameter tuning and/or model selection.

The ML model 111 can be trained (e.g., by the training component 108) to be uncertainty aware, such as by basing the ML model 111 on a natively uncertainty aware machine learning algorithm, for example, but not limited to, Gaussian processes and Bayesian neural networks, and/or through using one or more methods known to those skilled in the art for determining uncertainty from non-natively uncertainty aware machine learning models, for example, but not limited to, ensemble analysis and calibration models.

That is, the ML model 111 can be trained (e.g., by the training component 108) to provide a prediction regarding the usability of the defined parameter 113 relative to the VQA 119. In one instance, the usability can be related to low energy such that an ideal parameter is an increasingly low energy parameter as compared to previous defined parameters. In another instance, the usability can be related to low fidelity such that an ideal parameter is an increasingly low fidelity parameter as compared to previous defined parameters. One or more thresholds of the usability can be default and/or selectively established, such as by an entity accessing the parameter provision system 102, by the training component 108 and/or by the decision component 114.

A data component 110 can store the trained machine learning (ML) model 111 and/or information relating thereto, such as metadata. In one or more embodiments, an ML model 111 stored at the data component 110 can be an ML model that has been determined to be desirable (e.g., suitable or optimal) for storage in the data component 110, such as being an ML model 111 selected by an entity as providing usable parameters for use in one or more particular types of variational quantum algorithms In one or more embodiments, an ML model 111 can be stored at the central data store 109 and/or at any other storage device accessible by the parameter provision system 102.

The performance component 112 can operate the ML model 111 to provide the defined parameter 113 as a result. Likewise the performance component 112 can operate the ML model 111 to provide an uncertainty prediction 115 related for the defined parameter 113 and relative to the VQA 119. That is, in view of the ML model 111 being trained by the training component 108 with data specific to the VQA 119, the uncertainty prediction 115 can therefore be related to one or more aspects, goals and/or objectives of the VQA 119. The uncertainty prediction 115 can be a quantitative representation of the usability of the defined parameter 113 relative to the VQA 119. The uncertainty prediction 115 can be provided in any suitable format, such as a percentage, a number along a range and/or any other suitable format, such as related to the type of threshold set.

The decision component 114 can determine, based on the uncertainty prediction 115, how to proceed with the defined parameter 113. The function of the decision component 114 will be described in greater detail with respect to FIGS. 2 to 4. That is, the decision component 114 can provide a decision whether or not to utilize the defined parameter 113 for the VQA 119. For example, the decision component 114 can make a decision including: (a) to proceed with completely supplementary parameter optimization (e.g., Ansatz-based optimization) without employing the defined parameter 113 (e.g., FIG. 2); (b) to proceed with additional parameter optimization (e.g., Ansatz-based parameter optimization) using the defined parameter 113 as an initial start point (e.g., FIG. 3); or (c) to proceed without additional parameter optimization (e.g., FIG. 4).

As described herein, the decision component 114 can make such decision relative to at least two uncertainty thresholds, as will be explained below in detail. A first uncertainty threshold can be met to allow for completely bypassing parameter optimization. A second, and lower, uncertainty threshold can be met to allow for use of the defined parameter 113 as an initial start point for performing the parameter optimization. Additional and/or alternative thresholds can be utilized where suitable in one or more other embodiments.

Figure 2:
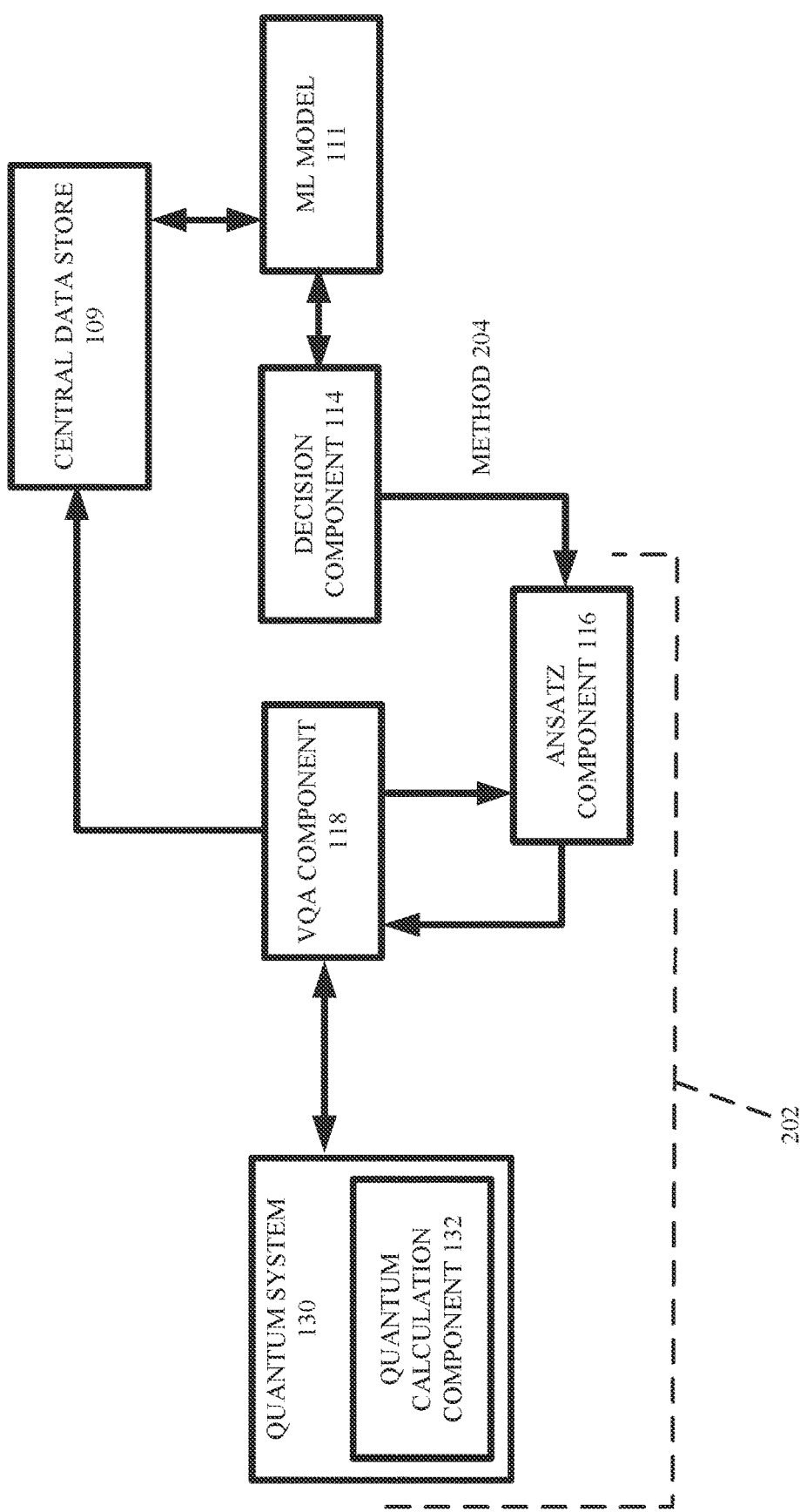
FIG. 2 illustrates another block diagram of an example, non-limiting system that can facilitate providing a defined parameter, determining whether to employ the defined parameter for a variational quantum algorithm, and operating the variational quantum algorithm on one or more qubits on a quantum system, in accordance with one or more embodiments described herein.
Figure 3:
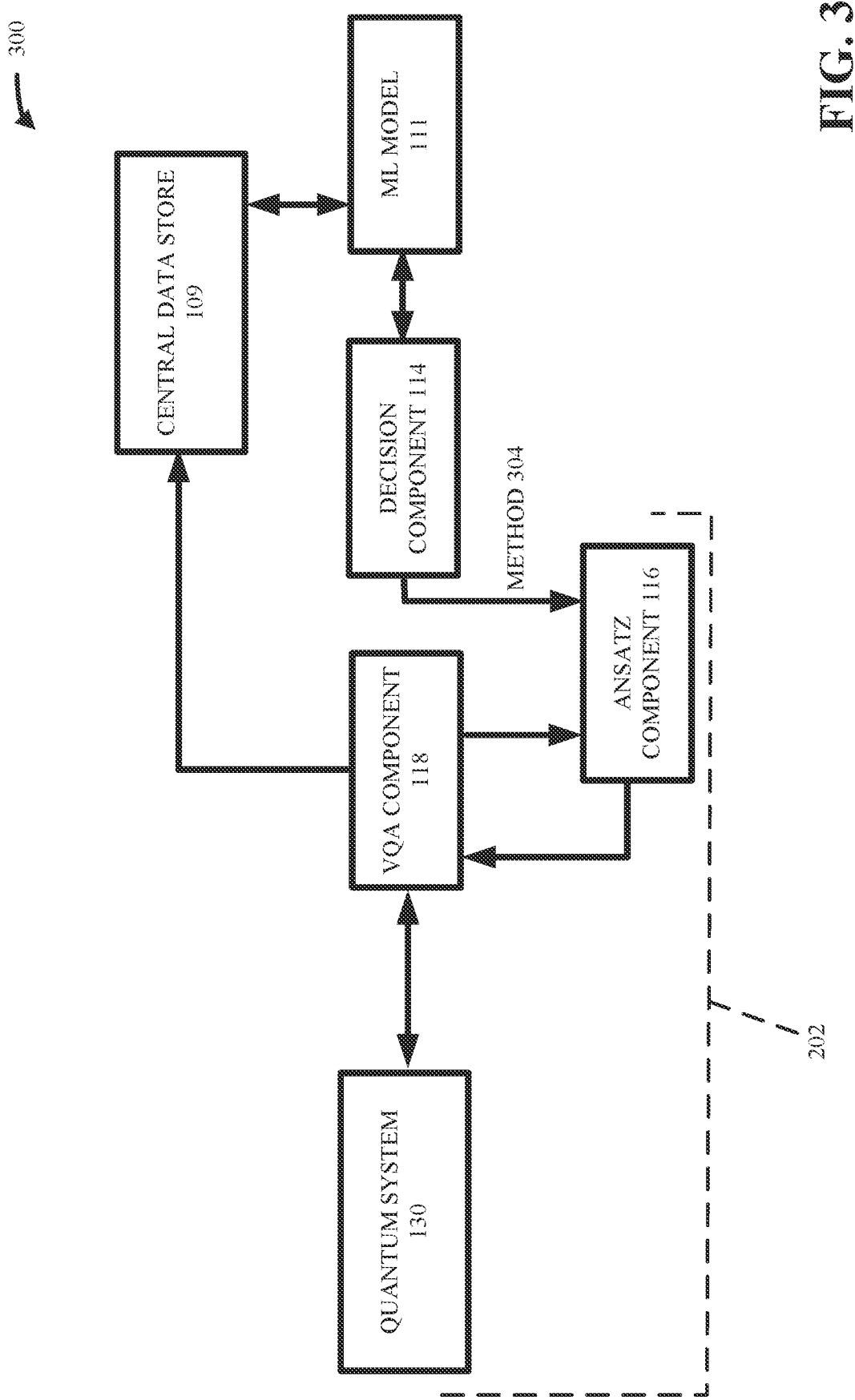
FIG. 3 illustrates yet another block diagram of an example, non-limiting system that can facilitate providing a defined parameter, determining whether to employ the defined parameter for a variational quantum algorithm, and operating the variational quantum algorithm on one or more qubits on a quantum system, in accordance with one or more embodiments described herein.
Figure 4:
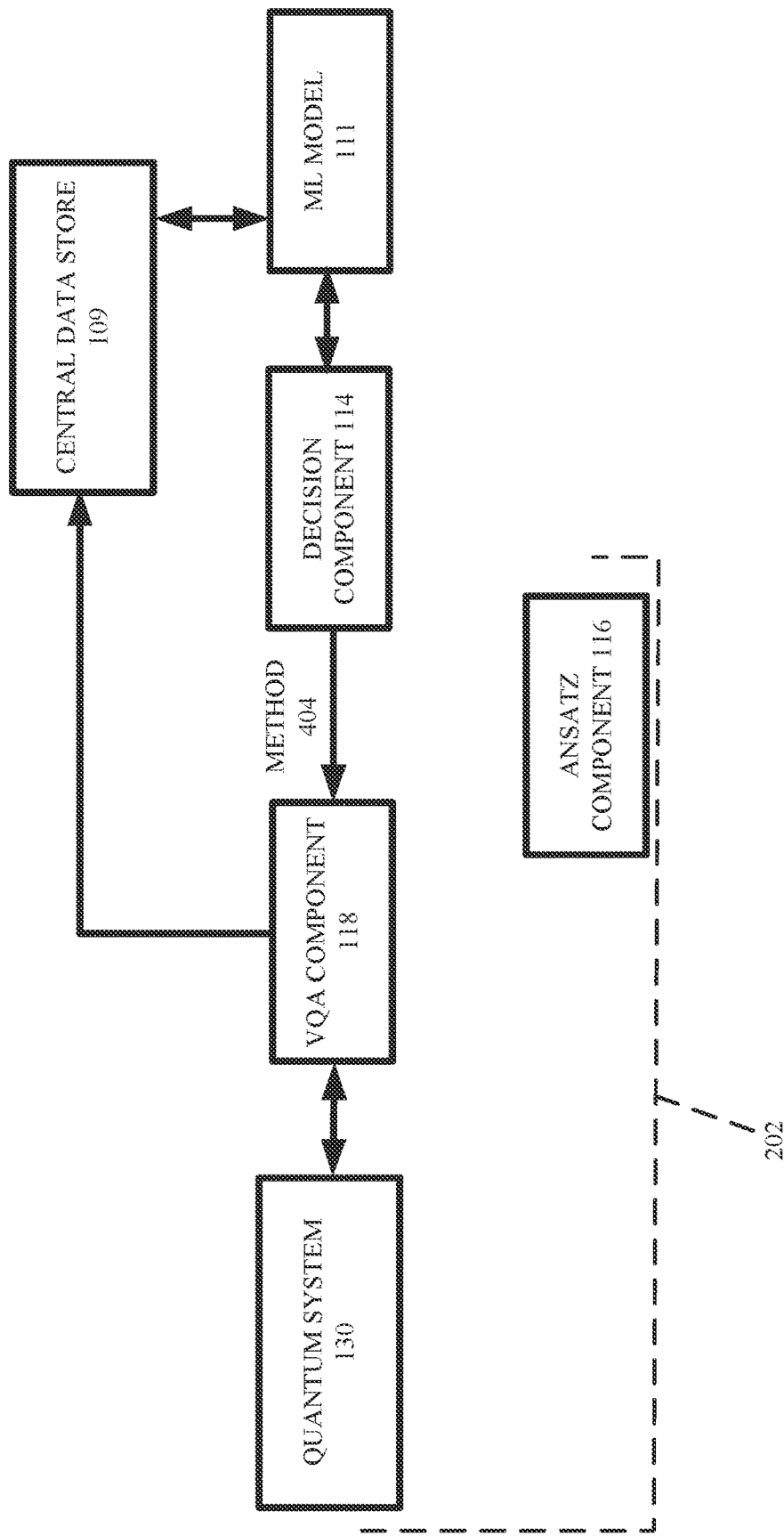
FIG. 4 illustrates still another block diagram of an example, non-limiting system that can facilitate providing a defined parameter, determining whether to employ the defined parameter for a variational quantum algorithm, and operating the variational quantum algorithm on one or more qubits on a quantum system, in accordance with one or more embodiments described herein.

Turning now to FIGS. 2 to 4, in addition to FIG. 1, each of FIGS. 2 to 4 illustrates a diagram of the example, non-limiting system 100 (FIG. 1) that can facilitate providing a defined parameter and determining whether to employ the defined parameter for a variational quantum algorithm. Three different illustrations (e.g., at FIGS. 2, 3 and 4) are provided detailing the parameter provision process resulting from different iterations of the aforementioned decision process performed by the decision component 114. Repetitive description of like elements and/or processes employed in the embodiment of FIG. 1 is omitted for sake of brevity.

First, referring first to FIGS. 2 to 4 collectively, the VQA component 118, the Ansatz component 116 and the quantum system 130 can be referred to as the optimization portion 202 of the respective diagrams 200, 300 and 400. The VQA component 118 can access the VQA 119, such as the VQA 119 being directly accessed by, indirectly accessed by and/or stored at the VQA component 118. Based on the VQA 119, the VQA component 118 can direct the provision, including searching, determination and/or optimization, of one or more supplementary parameters by the Ansatz component 116. That is, as shown, the VQA component 118 can communicate with the Ansatz component 116 such as to direct output of increasingly optimized supplementary parameters, such as low energy parameters, by the Ansatz component 116. Then, the VQA component 118 can direct execution of the VQA 119 on the quantum system 130.

The Ansatz component 116 can include a set of quantum circuits with one or more free parameters. The Ansatz component 116 can approximate a quantum state of interest where free parameters take certain optimal values. Generally, interaction of the Ansatz component 116 with the VQA component 118 enables finding one or more of these optimal values. For example, the Ansatz component 116 can employ an Ansatz method to optimize a supplementary parameter, different from the defined parameter 113, for running the VQA 119.

An Ansatz method can be selected by an entity, such as on the basis of empirical, physical and/or chemical considerations that can be problem-dependent. That is, the Ansatz component 116 can be pre-configured, such as by an entity and/or such as by being trained, such as employing the training component 108, to restrict the space of all possible parameter configurations down to a sector of configurations that are known in advance, have optimal related properties, and/or make sense for use with the particular VQA 119. One or more pre-configurations can be entered by an entity, such as via a respective GUI accessing the parameter provision system 102 and/or the VQA component 118.

Pre-configuring the Ansatz component 116 can involve choosing a set of parametrized circuits and choosing values for the initial parameters describing those circuits. The set of parametrized circuits can be selected by an entity, such as on the basis of empirical, physical and/or chemical considerations that can be problem-dependent. Initial parameters can be set to standard values (e.g., all zeros), random values and/or values from a previous calculation. In one or more cases, as will be explained below with respect to FIG. 3, an initial parameter can be the defined parameter 113 from the ML model 111, based on the decision made by the decision component 114.

To then search for and/or optimize supplementary parameters, the Ansatz component 116 can evaluate one or more associated cost functions and/or associated gradient/hessian (e.g., first and/or second derivatives of a gradient/hessian). That is, a cost function and/or a gradient/hessian thereof can be employed by a numerical optimizer (e.g., a conjugate gradient) to identify one or more optimizations of the initial parameters aimed at lowering the value of the cost function. Measurement can be performed regarding the cost function and its gradient/hessian. At the end of an optimization iteration, one or more objectives of the Ansatz component 116 are for the cost function to be lower than prior to the optimization iteration, for the gradient to be zero (e.g., such that a stationary point has been reached) and/or for the hessian to be positive (e.g., such that a local minimum has been reached).

Where one or more supplementary parameters are output from the Ansatz component 116, these one or more supplementary parameters can be tested on the quantum system 130 to determine whether they are suitable, e.g., optimal, for use in running the VQA 119. The quantum system 130 can comprise any one or more suitable quantum devices and/or components, such as a quantum computer and/or a quantum calculation component 132. The quantum calculation component 132 can perform one or more quantum processes, calculations and/or measurements for executing one or more quantum algorithms, such as the VQA 119. The quantum system 130 can be considered part of the non-limiting system 100, with the non-limiting system 100 being a hybrid system. In other embodiments, the quantum system 130 can be separate from, but function in combination with, the non-limiting system 100.

Such testing can include, for example, operating one or more quantum programs and/or portions of programs and/or operating one or more quantum circuits. The testing can include running the VQA or a portion of the VQA.

In view of the testing of the one or more supplementary parameters on the quantum system 130, the quantum system 130 can provide one or more outputs, such as one or more quantum measurements. For example, one or more results of the testing can be compared and/or otherwise analyzed, such as to determine a parameter that best maximized a cost function of the VQA (e.g., VQA 119) and/or that better maximized a cost function as compared to one or more previously employed parameters. It is noted that optimality of a parameter relative to maximizing a cost function can be dependent on the particular VQA to be run, such as a parameter being a low energy parameter or a low fidelity parameter.

As noted above, a goal of one type of VQA can be to maximize a cost function in terms of energy. A goal of another type of VQA can be to facilitate approximation of the action of a first quantum circuit over a given wave function based upon the action of a second quantum circuit over the given wave function.

The VQA component 118 can direct further iterations of searching, optimization and/or testing of one or more parameters by the Ansatz component 116 and/or the quantum system 130. Accordingly, through a plurality of iterations of these processes, the optimization portion 202 can provide one or more optimized supplementary parameters to the VQA component 118 for use in running the VQA 119 on the quantum system 130.

Furthermore, the central data store 109 can be communicatively connected to the VQA component 118, such as directly, or indirectly in other embodiments. In this way, the one or more supplementary parameters and/or associated metadata received from the Ansatz component 116, and/or the one or more measurement outputs received from the quantum system 130, can be added to the central data store 109.

Via one or more iterations of data added to the central data store 109, ML models trained by the training component 108, which can employ the central data store 109, can be increasingly better trained relative to one or more VQAs. In this way, the trained ML models can be increasingly capable of providing optimal parameters relative to one or more VQAs. That is, the non-limiting system 100 can itself increase its future optimal output, such as its ability to provide increasingly optimal defined parameters 113. Further, through the use of fewer resources for optimizing parameter values for subsequent VQA operations, the non-limiting system 100 can increase the throughput of the non-limiting system 100.

Referring now separately to FIG. 2, apart from FIGS. 3 and 4, a diagram 200 illustrates a first exemplary scenario of a performance iteration of the parameter provision system 102. Based on at least the uncertainty prediction 115, such as failing to meet and/or exceed a first uncertainty level and failing to meet and/or exceed a second uncertainty level, the decision component 114 can make a first decision (e.g., decision (a) referred to above). The first decision can include that the uncertainty prediction 115 has met neither of a first uncertainty threshold nor a second uncertainty threshold. That is, the uncertainty prediction 115 can fail to meet the first uncertainty threshold and be too high and thus does not meet and/or exceed the threshold to bypass parameter optimization. The uncertainty prediction 115 can also fail to meet and/or exceed the second uncertainty threshold and thus be too high to proceed with optimization using the defined parameter 113 as the initial start point for the optimization portion 202. That is, the decision component 114 can decide that the defined parameter 113 will not be utilized for running the VQA 119 and/or for optimizing a supplementary parameter for running the VQA 119.

In such case, the decision component 114 can direct the Ansatz component 116 to proceed with a method 204 comprising beginning a new parameter provision and optimization process. The optimization portion 202 can proceed with the aforementioned one or more iterations, such as performing an Ansatz-based optimization, with resulting data being added to the central data store 109. Data related to the performance of the ML model 111 and/or from the results of iterations of the optimization process performed can be added to the central data store 109 to allow for future updated training of an ML model 111, such as via the VQA component 118 and/or the updating component 120.

Looking next to FIG. 3, the figure illustrates a diagram 300 of a second exemplary scenario of a performance iteration of the parameter provision system 102. Based on at least the uncertainty prediction 115, such as meeting and/or exceeding the first uncertainty level but not the second uncertainty level, the decision component 114 can make a second decision (e.g., decision (b) referred to above). The second decision can include that the uncertainty prediction does not meet and/or exceed the first uncertainty threshold and thus is too high to bypass further optimization. However, in the case of diagram 300, the second decision can include that the uncertainty prediction 115 at least meets and/or exceeds the second uncertainty threshold for proceeding with parameter optimization by the optimization portion 202 and using the defined parameter 113 as the initial start point.

That is, the decision component 114 can decide that the defined parameter 113 will not be utilized for running the VQA 119, but that the defined parameter 113 can be utilized for accelerating the optimization process performed by the optimization portion 202. For example, the decision component 114 can direct the Ansatz component 116 to proceed with method 304 comprising performing parameter optimization (e.g., Ansatz-based optimization) using the defined parameter 113, instead of some other selected initial parameters, as an initial parameter for the optimization. This itself can provide acceleration as compared to performing a default Ansatz-based optimization.

As with method 204 described above, the optimization portion 202 employing method 304 also can proceed with the aforementioned one or more iterations of parameter optimization. Time and energy can be saved via accelerating the optimization process performed by the optimization portion 202 by providing a relevant starting point, i.e., the defined parameter 113. Also, data related to the performance of the ML model 111 and from one or more results of one or more iterations of the optimization process performed can be added to the central data store 109, such as via the VQA component 118 and/or the updating component 120, to allow for future updated training of an ML model 111.

Referring next to FIG. 4, the figure illustrates a diagram 400 of a third exemplary scenario of a performance iteration of the parameter provision system 102. Based on at least the uncertainty prediction 115, such as meeting and/or exceeding both the first uncertainty threshold and the second uncertainty threshold, the decision component 114 can make a third decision (e.g., decision (c) referred to above). The third decision can include that the uncertainty prediction 115 meets and/or exceeds the first uncertainty threshold to thus bypass further optimization. The third decision also can include that the uncertainty prediction 115 meets and/or exceeds the second uncertainty threshold to thus bypass accelerated parameter optimization. That is, the decision component 114 can determine that the defined parameter 113 itself can instead be utilized for running the VQA 119.

In such case, the decision component 114 can direct the VQA component 118 to proceed with method 404 and to utilize the defined parameter 113 for running the VQA 119 without a need for conducting Ansatz-based optimization by Ansatz component 116. In such case, the Ansatz-based optimization process will not be performed by the optimization portion 202, and the Ansatz component 116 can be unused by the method 404. Time and energy can be saved via fully bypassing the optimization process performed by the optimization portion 202. Also, data related to the performance of the ML model 111, such as the defined parameter 113 and related uncertainty prediction 115, can be added to the central data store 109, such as via the VQA component 118 and/or the updating component 120, to allow for future updated training of an ML model 111.

Looking again briefly to FIG. 1, regardless of the method 204, 304 or 404 directed by the decision component 114, the updating component 120 can facilitate the addition of resultant data, such as the one or more defined parameters 113, uncertainty prediction 115 and/or results from the optimization portion 202, to the central data store 109. That is, the updating component 120 can communicate with one or more components of the parameter provision system 102, such as the decision component 114, performance component 112 and/or VQA component 118 to determine whether one or more aspects of resultant data are available for being added to the central data store 109. As indicated above, this can allow for future updated training of an ML model 111.

In one or more embodiments, the parameter provision system 102 can include an aggregation component 122 that can facilitate updating of the central data store 109 with one or more defined parameters, associated uncertainty predictions and/or a combination thereof from a plurality of systems. This plurality of systems can include one or more systems having an embodiment of a parameter provision system as described herein or communicating with a system having an embodiment of a parameter provision system as described herein. The systems of this plurality of systems can be distributed relative to one another. In one or more embodiments, the systems of this plurality of systems can be additionally and/or alternatively decentralized relative to one another. In one or more embodiments, one or more systems of this plurality of systems can communicate with the non-limiting system 100 (e.g., the parameter provision system 102 and/or the aggregation component 122) and/or directly with the central data store 109 via a network, such as via the cloud. Via these one or more embodiments, scaled addition of data to the central data store 109 can be facilitated, allowing for better training of uncertainty aware ML models for providing parameters for running a VQA. It thus will be appreciated that any number of the systems of the aforementioned plurality of systems can employ the same central data store 109 to train respective ML models.

Figure 5:
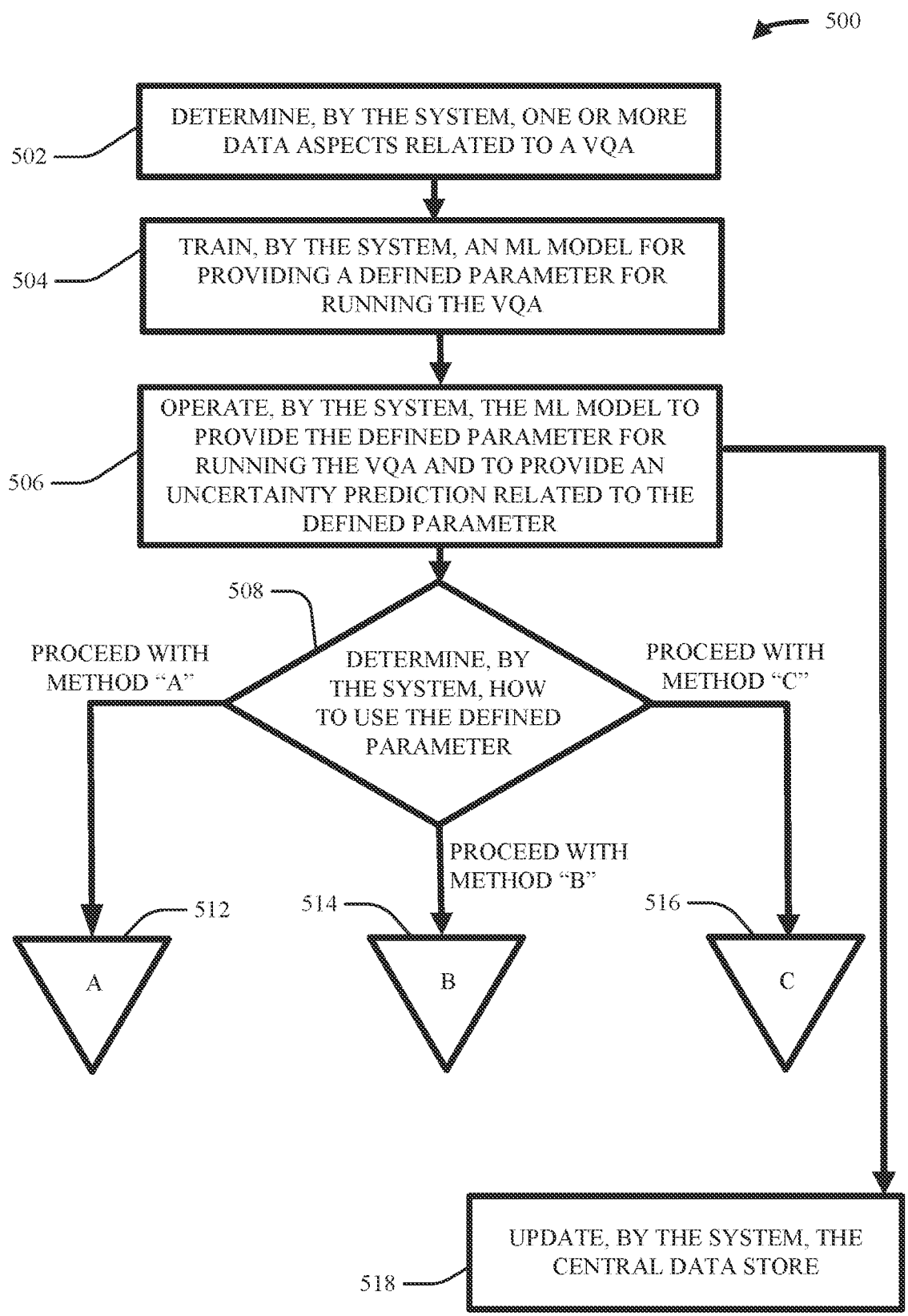
FIG. 5 illustrates a flow diagram of an example, non-limiting computer-implemented method that can facilitate providing a defined parameter, determining whether to employ the defined parameter for a variational quantum algorithm, and operating the variational quantum algorithm on one or more qubits on a quantum system, in accordance with one or more embodiments described herein.
Figure 6:
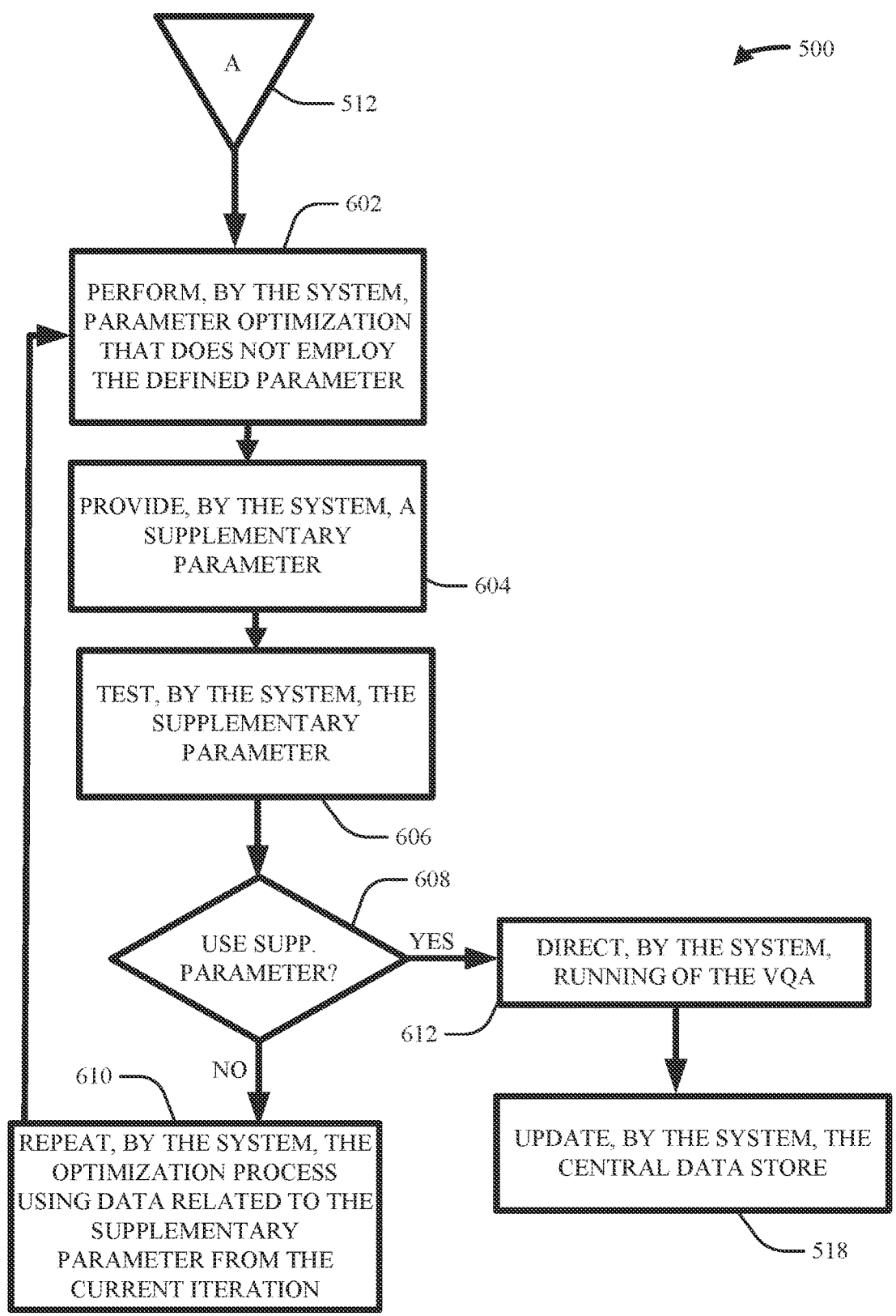
FIG. 6 illustrates a continuation of the flow diagram of FIG. 5, of an example, non-limiting computer-implemented method that can facilitate providing a defined parameter, determining whether to employ the defined parameter for a variational quantum algorithm, and operating the variational quantum algorithm on one or more qubits on a quantum system, in accordance with one or more embodiments described herein.
Figure 7:
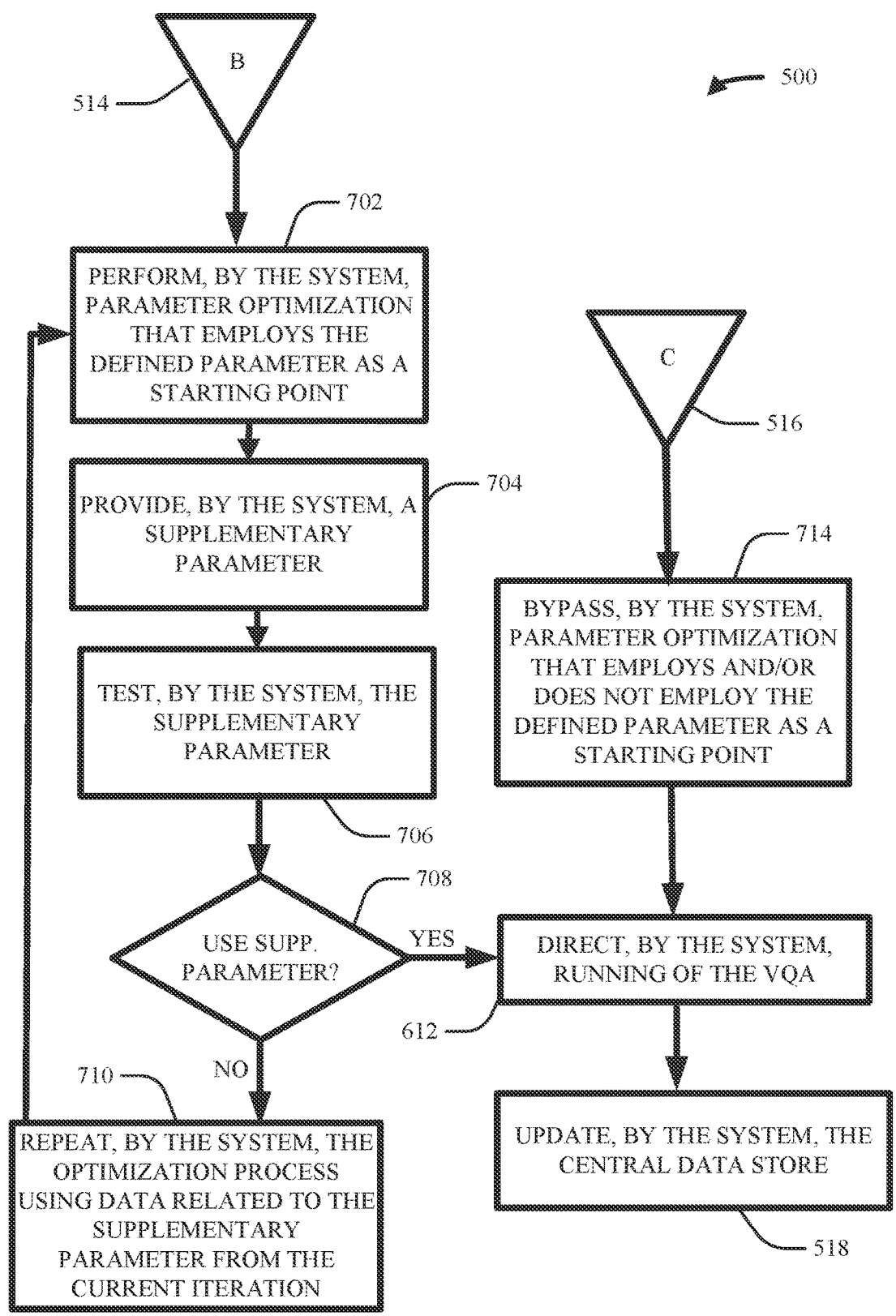
FIG. 7 illustrates a continuation of the flow diagram of FIG. 5, of an example, non-limiting computer-implemented method that can facilitate providing a defined parameter, determining whether to employ the defined parameter for a variational quantum algorithm, and operating the variational quantum algorithm on one or more qubits on a quantum system, in accordance with one or more embodiments described herein.

Turning now to FIGS. 5 through 7, these figures together illustrate a flow diagram of an example, non-limiting computer-implemented method 500 that can facilitate providing a defined parameter, determining whether to employ the defined parameter for a variational quantum algorithm, and operating the variational quantum algorithm on one or more qubits on a quantum system, in accordance with one or more embodiments described herein. Repetitive description of like elements and/or processes employed in respective embodiments is omitted for sake of brevity.

Looking first to 502 at FIG. 5, the computer-implemented method 500 can comprise determining, by a system (e.g., via parameter provision system 102 and/or training component 108, and/or using central data store 109) operatively coupled to a processor (e.g., processor 104, a quantum processor and/or like processor), one or more aspects of data (e.g., historical data) to employ for training of a machine learning (ML) model (e.g., ML model 111) directed to generation of a defined parameter (e.g., a variational parameter, such as the defined parameter 113) for use by an algorithm (e.g., VQA 119).

Looking next to 504, the computer-implemented method 500 can comprise training, by a system (e.g., via parameter provision system 102 and/or performance component 112, and/or using central data store 109), the ML model (e.g., ML model 111).

At 506, the computer-implemented method 500 can comprise operating, by the system (e.g., via parameter provision system 102 and/or training component 108), the ML model (e.g., ML model 111) to provide a defined parameter (e.g., defined parameter 113) for running the VQA (e.g., VQA 119).

At 506, the computer-implemented method 500 also can comprise operating, by the system (e.g., via parameter provision system 102 and/or training component 108), the ML model (e.g., ML model 111) to provide an uncertainty prediction (e.g., uncertainty prediction 115) related to the defined parameter (e.g., defined parameter 113).

The computer-implemented method 500 can proceed from block 506 to each of blocks 508 and 518, successively and/or at least partially concurrently.

At 518, the computer-implemented method 500 can comprise updating, by the system (e.g., via parameter provision system 102 and/or data component 110), the central data store (e.g., central data store 109) with the results from the ML model (e.g., defined parameter 113 and/or uncertainty prediction 115 from the ML model 111).

At 508, the computer-implemented method 500 can comprise determining, by the system (e.g., via parameter provision system 102 and/or decision component 114), how to use the defined parameter (e.g., defined parameter 113). Based on the uncertainty prediction (e.g., uncertainty prediction 115) and one or more defined uncertainty thresholds, the computer-implemented method 500 can comprise determining, by a system (e.g., via parameter provision system 102 and/or decision component 114) to implement any of method "A", method "B" or method "C" (e.g., methods 204, 304 and 404, respectively).

Turning to FIG. 6, this figure illustrates an extension of the computer-implemented method 500 of FIG. 5. Triangle "A" 512 represents a continuation point for moving from FIG. 5 to FIG. 6.

At 602, the computer-implemented method 500 can comprise performing, by the system (e.g., via parameter provision system 102, optimization portion 202, VQA component 118 and/or Ansatz component 116), parameter optimization (e.g., Ansatz-based parameter optimization) that does not employ the defined parameter (e.g., defined parameter 113). As discussed above with respect to FIGS. 1 and 2, the VQA component 118 can direct the Ansatz component 116 in parameter optimization.

Turning to 604, the computer-implemented method 500 can comprise providing the results (e.g., one or more supplementary parameters) by the system (e.g., via parameter provision system 102 and/or VQA component 118), for being tested.

At 606, the computer-implemented method 500 can comprise testing, by the system (e.g., via parameter provision system 102, VQA component 118, quantum system 130 and/or quantum calculation component 132), the one or more supplementary parameters to determine whether they are suitable, e.g., optimal, for use in running the VQA 119. Such testing can include, for example, operating one or more quantum programs and/or portions of programs and/or operating one or more quantum circuits. The testing can include running the VQA or a portion of the VQA. It will be appreciated that the quantum system 130 can be considered part of the non-limiting system 100 or the quantum system 130 can function in combination with the non-limiting system 100.

At 608, the computer-implemented method 500 can comprise determining, by the system (e.g., via parameter provision system 102 and/or VQA component 118), whether or not to use the tested one or more supplementary parameters for running the VQA (e.g., VQA 119). For example, one or more results of the testing can be compared and/or otherwise analyzed, such as to determine a parameter that best maximized a cost function of the VQA (e.g., VQA 119) and/or that better maximized a cost function as compared to one or more previously employed parameters.

Where the answer at the determination block 608 is no, at 610 the computer-implemented method 500 can comprise repeating, by the system (e.g., via parameter provision system 102 and/or VQA component 118), the optimization process (e.g., Ansatz-based parameter optimization) using data related to the supplementary parameter from the current iteration. That is, the computer-implemented method 500 can re-execute the processes of blocks 602, 604, 606 and 608.

Where the answer at the determination block 608 is yes, at 612, the computer-implemented method 500 can comprise directing, by the system (e.g., via parameter provision system 102 and/or VQA component 118), running of the VQA (e.g., VQA 119) using the supplementary parameter. That is, the VQA (e.g., VQA 119) can be operated (e.g., via VQA component 118, quantum system 130 and/or quantum calculation component 132) on one or more qubits of a quantum system (e.g., quantum system 130).

Then, at 518, the computer-implemented method 500 can comprise updating, by the system (e.g., via parameter provision system 102 and/or VQA component 118), the central data store 109 with the resulting one or more parameter iterations and/or quantum test results from the optimization portion 202.

Turning now to FIG. 7, this figure illustrates additional extensions of the computer-implemented method 500 of FIG. 5. Triangles "B" 514 and "C" 516 each represent a continuation point for moving from FIG. 5 to FIG. 7.

Looking first to the continuation triangle "B" 514, at 702, the computer-implemented method 500 can comprise performing, by the system (e.g., via parameter provision system 102, optimization portion 202, VQA component 118 and/or Ansatz component 116), parameter optimization (e.g., Ansatz-based parameter optimization) that employs the defined parameter (e.g., defined parameter 113) as a starting point. As discussed above with respect to FIGS. 1 and 3, the VQA component 118 can direct the Ansatz component 116 in parameter optimization.

Turning to 704, the computer-implemented method 500 can comprise providing the results (e.g., one or more supplementary parameters) by the system (e.g., via parameter provision system 102 and/or VQA component 118), for being tested.

At 706, the computer-implemented method 500 can comprise testing, by the system (e.g., via parameter provision system 102, VQA component 118, quantum system 130 and/or quantum calculation component 132), the one or more supplementary parameters to determine a suitable, e.g., optimal, parameter, such as relative to a maximizing a cost function of the VQA (e.g., VQA 119). For example, such testing can include, operating one or more quantum programs and/or portions of programs and/or operating one or more quantum circuits. The testing can include running the VQA or a portion of the VQA. It will be appreciated that the quantum system 130 can be considered part of the non-limiting system 100 or that the quantum system 130 can function in combination with the non-limiting system 100.

At 708, the computer-implemented method 500 can comprise determining, by the system (e.g., via parameter provision system 102 and/or VQA component 118), whether or not to use the tested one or more supplementary parameters for running the VQA (e.g., VQA 119). For example, one or more results of the testing can be compared and/or otherwise analyzed, such as to determine a parameter that best maximized a cost function of the VQA (e.g., VQA 119) and/or that better maximized a cost function as compared to one or more previously employed parameters.

Where the answer from the determination block 708 is no, at 710 the computer-implemented method 500 can comprise repeating, by the system (e.g., via parameter provision system 102 and/or VQA component 118), the optimization process (e.g., Ansatz-based parameter optimization) using data related to the supplementary parameter from the current iteration. That is, the computer-implemented method 500 can re-execute the processes of blocks 702, 704, 706 and 708.

Where the answer from the determination block 708 is yes, at 612, the computer-implemented method 500 can comprise directing, by a system (e.g., via parameter provision system 102 and/or VQA component 118), running of the VQA (e.g., VQA 119) using the supplementary parameter. That is, the VQA (e.g., VQA 119) can be operated (e.g., via VQA component 118, quantum system 130 and/or quantum calculation component 132) on one or more qubits of a quantum system (e.g., quantum system 130).

Then, at 518, the computer-implemented method 500 can comprise updating, by a system (e.g., via parameter provision system 102 and/or VQA component 118), the central data store 109 with the resulting one or more parameter iterations and/or quantum test results from the optimization portion 202.

Looking still to FIG. 7, and now to continuation triangle "C" 516, the computer-implemented method 500 can comprise, at block 714, bypassing, by the system (e.g., via parameter provision system 102 and/or VQA component 118), any parameter optimization (e.g., parameter optimization) that employs or does not employ the defined parameter (e.g., defined parameter 113). As discussed above with respect to FIGS. 1 and 4, the VQA component 118 via this process does not direct the Ansatz component 116 in parameter optimization.

Next, at 612, the computer-implemented method 500 can comprise directing, by a system (e.g., via parameter provision system 102 and/or VQA component 118), running of the VQA (e.g., VQA 119) using the defined parameter (e.g., defined parameter 113).

Then, at 518, the computer-implemented method 500 can comprise updating, by a system (e.g., via parameter provision system 102 and/or VQA component 118), the central data store 109 with the resulting one or more parameter iterations from the optimization portion 202.

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring the computer-implemented methodologies to computers. The term article of manufacture, as used herein, is intended to encompass a computer program accessible from any computer-readable device or storage media.

In the above examples, it should be appreciated that one or more embodiments described herein can enable technical improvements to a processing unit (e.g., processor 104) associated with parameter provision system 102. By reducing and/or altogether bypassing supplementary optimization of a parameter prior to its implementation in a VQA, the parameter provision system 102 can thereby facilitate improved performance, improved efficiency and/or reduced computational cost associated with a processing unit (e.g., processor 104) employing the parameter provision system 102. That is, through the use of fewer resources for optimizing parameter values for subsequent VQA operations, the non-limiting system 100 can increase the throughput of the non-limiting system 100. Further, by providing parameters having high usability, such as being low energy or low fidelity parameters, the VQA can be run more efficiently, using less energy and/or time, for example, and thus resulting in respectively reduced error during operation on one or more qubits of a quantum system.

It should also be appreciated that the parameter provision system 102 can enable scaling of parameter provision, including parameter optimization, and/or execution of related VQAs. That is, where each parameter provision enables reduced time and energy, additional parameter provisions and/or implementations of VQAs can be performed concurrently and/or subsequently relative to one another.

In one or more instances, one or more embodiments as described herein can integrate the disclosed teachings into a practical application. Indeed, as described herein, one or more embodiments, which can take the form of systems, computer-implemented methods, and/or computer program products can be considered as a computerized tool that can receive as an input one or more data aspects and that can generate as an output a parameter (e.g., a variational parameter for a VQA) and an uncertainty prediction relative to the parameter. More specifically, the computerized tool can generate an uncertainty aware machine model to facilitate a determination as to how and/or whether or not to direct use of the defined parameter by the VQA. This determination can reduce and/or bypass parameter optimization via an Ansatz method. Furthermore via use of the associated central data store, the non-limiting system 100 can itself increase its future optimal output, such as its ability to provide increasingly improved defined parameters. This is a useful and practical application of computers, especially in view of the costly nature (e.g., in terms of time, energy and/or fidelity) of parameter provision, including optimization, for quantum computation. Overall, such computerized tools constitute a concrete and tangible technical improvement in the field of quantum parameter provision.

Additionally, it is noted that one or more embodiments described herein can control real-world devices based on the disclosed teachings. For example, embodiments described herein can receive as input real-world data aspects, such as including historical data, and can generate as output a defined parameter (e.g., a variational parameter for a VQA) and an uncertainty prediction relative to the defined parameter. The defined parameter can be utilized to operate the associated VQA on or more qubits of a real-world quantum computing device. That is, one or more embodiments described herein can execute such real-world defined parameters on a real-world quantum computing device.

It is to be appreciated that one or more embodiments described herein can employ hardware and/or software to solve problems that are highly technical in nature (e.g., related to generating a variational quantum parameter for running a quantum algorithm), that are not abstract, and that cannot be performed as a set of mental acts by a human. For example, a human, or even thousands of humans, cannot efficiently, accurately and/or effectively provide, such as including optimization of, a parameter for a variational quantum algorithm in the time that one or more embodiments described herein can facilitate this process. And, neither the human mind nor a human with pen and paper can electronically provide a variational quantum parameter, associated uncertainty prediction and/or subsequent optimization.

That is, one or more embodiments described herein are inherently and inextricably tied to computer technology and cannot be implemented outside of a hybrid classical/quantum computing environment. For example, one or more processes performed by one or more embodiments described herein can more efficiently provide these parameters as compared to current systems and/or techniques. Systems, computer-implemented methods and/or computer program products facilitating performance of these processes are of great utility in the field of quantum computation and cannot be equally practicably implemented in a sensible way outside of a computing environment.

In one or more embodiments, one or more of the processes described herein can be performed by one or more specialized computers (e.g., a specialized processing unit, a specialized classical computer, a specialized quantum computer, a specialized hybrid classical/quantum system and/or another type of specialized computer) to execute defined tasks related to the various technologies describe above. One or more embodiments described herein and/or components thereof, can be employed to solve new problems that arise through advancements in technologies mentioned above, employment of quantum computing systems, cloud computing systems, computer architecture and/or another technology.

One or more embodiments described herein can be fully operational towards performing one or more other functions (e.g., fully powered on, fully executed and/or another function) while also performing the one or more operations described herein.

Figure 8:
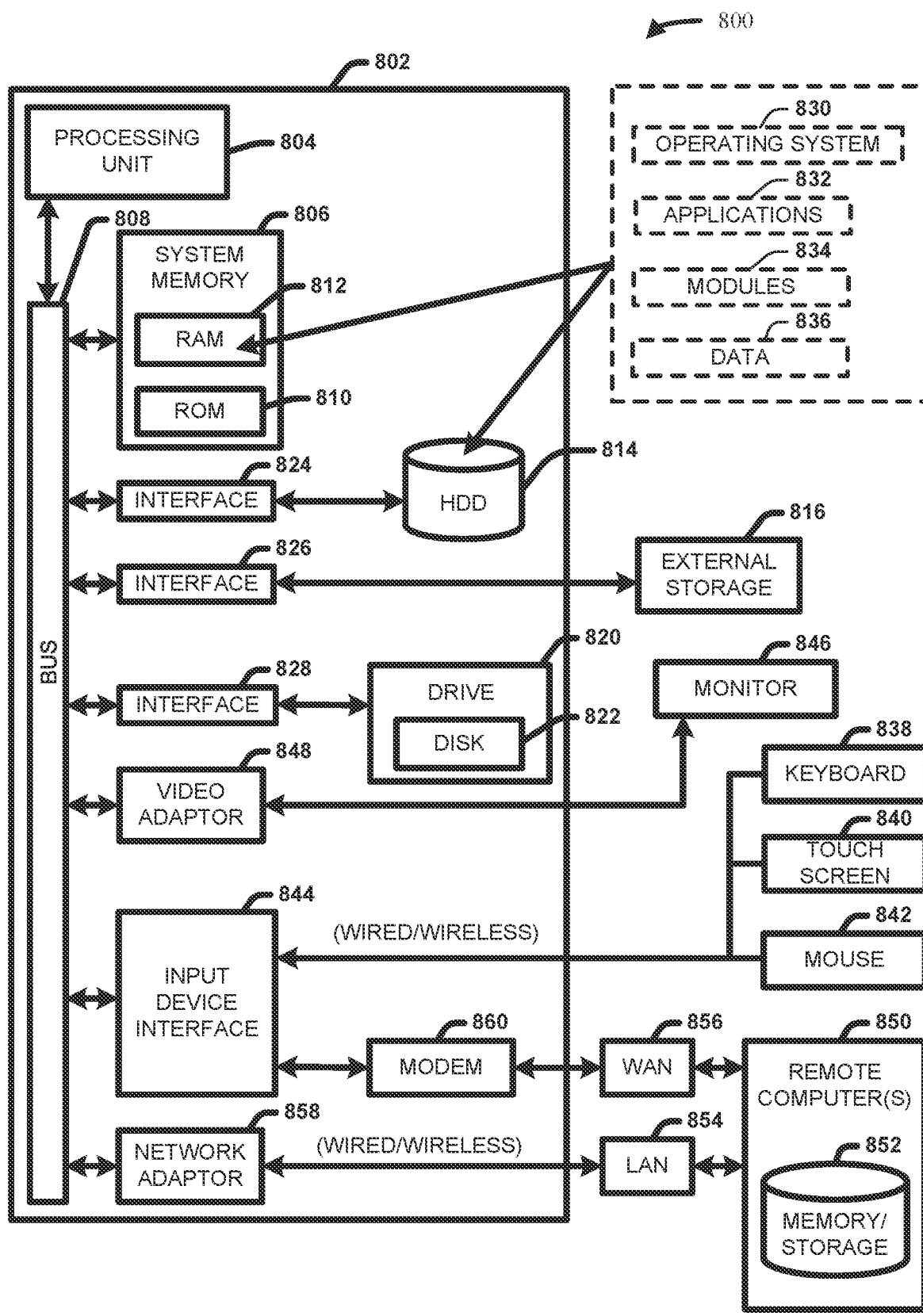
FIG. 8 illustrates a block diagram of an example, non-limiting operating environment in which one or more embodiments described herein can be facilitated.

In order to provide additional context for one or more embodiments described herein, FIG. 8 and the following discussion are intended to provide a brief, general description of a suitable operating environment 800 in which the one or more embodiments described herein can be implemented. For example, one or more components and/or other aspects of embodiments described herein can be implemented in or be associated with the operating environment 800. Further, while one or more embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures and/or the like, that perform particular tasks and/or implement particular abstract data types. Moreover, those skilled in the art will appreciate that the inventive methods can be practiced with other computer system configurations, including single-processor or multi-processor computer systems, minicomputers, mainframe computers, Internet of Things (IoT) devices, distributed computing systems, as well as personal computers, handheld computing devices, microprocessor-based or programmable consumer electronics, and the like, each of which can be operatively coupled to one or more associated devices.

Computing devices typically include a variety of media, which can include computer-readable storage media, machine-readable storage media and/or communications media, which two terms are used herein differently from one another as follows. Computer-readable storage media or machine-readable storage media can be any available storage media that can be accessed by the computer and includes both volatile and nonvolatile media, removable and non-removable media. By way of example, but not limitation, computer-readable storage media and/or machine-readable storage media can be implemented in connection with any method or technology for storage of information such as computer-readable and/or machine-readable instructions, program modules, structured data and/or unstructured data.

Computer-readable storage media can include, but are not limited to, random access memory (RAM), read only memory (ROM), electrically erasable programmable read only memory (EEPROM), flash memory or other memory technology, compact disk read only memory (CD ROM), digital versatile disk (DVD), Blu-ray disc (BD) and/or other optical disk storage, magnetic cassettes, magnetic tape, magnetic disk storage and/or other magnetic storage devices, solid state drives or other solid state storage devices and/or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory and/or computer-readable media that are not only propagating transitory signals per se.

Computer-readable storage media can be accessed by one or more local or remote computing devices, e.g., via access requests, queries and/or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, but not limitation, communication media can include wired media, such as a wired network, direct-wired connection and/or wireless media such as acoustic, RF, infrared and/or other wireless media.

With reference again to FIG. 8, the example operating environment 800 for implementing one or more embodiments of the aspects described herein can include a computer 802, the computer 802 including a processing unit 804, a system memory 806 and/or a system bus 808. It will be appreciated that any aspect of the system memory 806 or processing unit 804 can be applied to memory 106 or processor 104, respectively of the non-limiting system 100 and/or can be implemented in combination and/or alternatively to memory 106 or processor 104, respectively.

Memory 806 can store one or more computer and/or machine readable, writable and/or executable components and/or instructions that, when executed by processing unit 804 (e.g., a classical processor, a quantum processor and/or like processor), can facilitate performance of operations defined by the executable component(s) and/or instruction(s). For example, memory 806 can store computer and/or machine readable, writable and/or executable components and/or instructions that, when executed by processing unit 804, can facilitate execution of the various functions described herein relating to non-limiting system 100 and/or parameter provision system 102, as described herein with or without reference to the various figures of the one or more embodiments.

Memory 806 can comprise volatile memory (e.g., random access memory (RAM), static RAM (SRAM), dynamic RAM (DRAM) and/or the like) and/or non-volatile memory (e.g., read only memory (ROM), programmable ROM (PROM), electrically programmable ROM (EPROM), electrically erasable programmable ROM (EEPROM) and/or the like) that can employ one or more memory architectures.

Processing unit 804 can comprise one or more types of processors and/or electronic circuitry (e.g., a classical processor, a quantum processor and/or like processor) that can implement one or more computer and/or machine readable, writable and/or executable components and/or instructions that can be stored at memory 806. For example, processing unit 804 can perform one or more operations that can be specified by computer and/or machine readable, writable and/or executable components and/or instructions including, but not limited to, logic, control, input/output (I/O), arithmetic and/or the like. In one or more embodiments, processing unit 804 can be any of various commercially available processors. In one or more embodiments, processing unit 804 can comprise one or more central processing unit, multi-core processor, microprocessor, dual microprocessors, microcontroller, System on a Chip (SOC), array processor, vector processor, quantum processor and/or another type of processor. The examples of processing unit 804 can be employed to implement any one or more embodiments described herein.

The system bus 808 can couple system components including, but not limited to, the system memory 806 to the processing unit 804. The system bus 808 can be any of several types of bus structure that can further interconnect to a memory bus (with or without a memory controller), a peripheral bus and/or a local bus using any of a variety of commercially available bus architectures. The system memory 806 can include ROM 810 and/or RAM 812. A basic input/output system (BIOS) can be stored in a non-volatile memory such as ROM, erasable programmable read only memory (EPROM) and/or EEPROM, which BIOS contains the basic routines that help to transfer information among elements within the computer 802, such as during startup. The RAM 812 can also include a high-speed RAM, such as static RAM for caching data.

The computer 802 further can include an internal hard disk drive (HDD) 814 (e.g., EIDE, SATA), one or more external storage devices 816 (e.g., a magnetic floppy disk drive (FDD), a memory stick or flash drive reader, a memory card reader and/or the like) and/or a drive 820, e.g., such as a solid state drive or an optical disk drive, which can read or write from a disk 822, such as a CD-ROM disc, a DVD, a BD and/or the like. Additionally and/or alternatively, where a solid state drive is involved, disk 822 could not be included, unless separate. While the internal HDD 814 is illustrated as located within the computer 802, the internal HDD 814 can also be configured for external use in a suitable chassis (not shown). Additionally, while not shown in operating environment 800, a solid state drive (SSD) could be used in addition to, or in place of, an HDD 814. The HDD 814, external storage device(s) 816 and drive 820 can be connected to the system bus 808 by an HDD interface 824, an external storage interface 826 and a drive interface 828, respectively. The HDD interface 824 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 802, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 812, including an operating system 830, one or more applications 832, other program modules 834 and/or program data 836. All or portions of the operating system, applications, modules and/or data can also be cached in the RAM 812. The systems and methods described herein can be implemented utilizing various commercially available operating systems and/or combinations of operating systems.

Computer 802 can optionally comprise emulation technologies. For example, a hypervisor (not shown) or other intermediary can emulate a hardware environment for operating system 830, and the emulated hardware can optionally be different from the hardware illustrated in FIG. 8. In a related embodiment, operating system 830 can comprise one virtual machine (VM) of multiple VMs hosted at computer 802. Furthermore, operating system 830 can provide runtime environments, such as the JAVA runtime environment or the .NET framework, for applications 832. Runtime environments are consistent execution environments that allow applications 832 to run on any operating system that includes the runtime environment. Similarly, operating system 830 can support containers, and applications 832 can be in the form of containers, which are lightweight, standalone, executable packages of software that include, e.g., code, runtime, system tools, system libraries and/or settings for an application.

Further, computer 802 can be enabled with a security module, such as a trusted processing module (TPM). For instance, with a TPM, boot components hash next in time boot components and wait for a match of results to secured values before loading a next boot component. This process can take place at any layer in the code execution stack of computer 802, e.g., applied at application execution level and/or at operating system (OS) kernel level, thereby enabling security at any level of code execution.

An entity can enter and/or transmit commands and information into the computer 802 through one or more wired/wireless input devices, e.g., a keyboard 838, a touch screen 840 and/or a pointing device, such as a mouse 842. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices can be connected to the processing unit 804 through an input device interface 844 that can be coupled to the system bus 808, but can be connected by other interfaces, such as a parallel port, an IEEE 1394 serial port, a game port, a USB port, an IR interface, a BLUETOOTH® interface and/or the like.

A monitor 846 or other type of display device can be alternatively and/or additionally connected to the system bus 808 via an interface, such as a video adapter 848. In addition to the monitor 846, a computer typically includes other peripheral output devices (not shown), such as speakers, printers and/or the like.

The computer 802 can operate in a networked environment using logical connections via wired and/or wireless communications to one or more remote computers, such as a remote computer(s) 850. The remote computer(s) 850 can be a workstation, a server computer, a router, a personal computer, portable computer, microprocessor-based entertainment appliance, a peer device and/or other common network node, and typically includes many or all of the elements described relative to the computer 802, although, for purposes of brevity, only a memory/storage device 852 is illustrated. Additionally and/or alternatively, the computer 802 can be coupled (e.g., communicatively, electrically, operatively, optically and/or the like) to one or more external systems, sources and/or devices (e.g., classical and/or quantum computing devices, communication devices and/or like device) via a data cable (e.g., High-Definition Multimedia Interface (HDMI), recommended standard (RS) 232, Ethernet cable and/or the like).

In one or more embodiments, a network can comprise one or more wired and/or wireless networks, including, but not limited to, a cellular network, a wide area network (WAN) (e.g., the Internet), or a local area network (LAN). For example, one or more embodiments described herein can communicate with one or more external systems, sources and/or devices, for instance, computing devices (and vice versa) using virtually any desired wired or wireless technology, including but not limited to: wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol and/or other proprietary and/or non-proprietary communication protocols. In a related example, one or more embodiment described herein can include hardware (e.g., a central processing unit (CPU), a transceiver, a decoder, quantum hardware, a quantum processor and/or the like), software (e.g., a set of threads, a set of processes, software in execution, quantum pulse schedule, quantum circuit, quantum gates and/or the like) and/or a combination of hardware and software that facilitates communicating information among one or more embodiments described herein and external systems, sources and/or devices (e.g., computing devices, communication devices and/or the like).

The logical connections depicted include wired/wireless connectivity to a local area network (LAN) 854 and/or larger networks, e.g., a wide area network (WAN) 856. LAN and WAN networking environments are commonplace in offices and companies, and facilitate enterprise-wide computer networks, such as intranets, all of which can connect to a global communications network, e.g., the Internet.

When used in a LAN networking environment, the computer 802 can be connected to the local network 854 through a wired and/or wireless communication network interface or adapter 858. The adapter 858 can facilitate wired or wireless communication to the LAN 854, which can also include a wireless access point (AP) disposed thereon for communicating with the adapter 858 in a wireless mode.

When used in a WAN networking environment, the computer 802 can include a modem 860 and/or can be connected to a communications server on the WAN 856 via other means for establishing communications over the WAN 856, such as by way of the Internet. The modem 860, which can be internal or external and a wired and/or wireless device, can be connected to the system bus 808 via the input device interface 844. In a networked environment, program modules depicted relative to the computer 802 or portions thereof, can be stored in the remote memory/storage device 852. It will be appreciated that the network connections shown are example and other means of establishing a communications link among the computers can be used.

When used in either a LAN or WAN networking environment, the computer 802 can access cloud storage systems or other network-based storage systems in addition to, or in place of, external storage devices 816 as described above, such as but not limited to, a network virtual machine providing one or more aspects of storage or processing of information. Generally, a connection between the computer 802 and a cloud storage system can be established over a LAN 854 or WAN 856 e.g., by the adapter 858 or modem 860, respectively. Upon connecting the computer 802 to an associated cloud storage system, the external storage interface 826 can, with the aid of the adapter 858 and/or modem 860, manage storage provided by the cloud storage system as it would other types of external storage. For instance, the external storage interface 826 can be configured to provide access to cloud storage sources as if those sources were physically connected to the computer 802.

The computer 802 can be operable to communicate with any wireless devices or entities operatively disposed in wireless communication, e.g., a printer, scanner, desktop and/or portable computer, portable data assistant, communications satellite, telephone and/or any piece of equipment or location associated with a wirelessly detectable tag (e.g., a kiosk, news stand, store shelf and/or the like). This can include Wireless Fidelity (Wi-Fi) and BLUETOOTH® wireless technologies. Thus, the communication can be a predefined structure as with a conventional network or simply an ad hoc communication between at least two devices.

The illustrated embodiments described herein can be also practiced in distributed computing environments (e.g., cloud computing environments), such as described below with respect to FIG. 9, at 900 where certain tasks are performed by remote processing devices that are linked through a communications network. In a distributed computing environment, program modules can be located both in local and remote memory storage devices.

For example, one or more embodiments described herein and/or one or more components thereof can employ one or more computing resources of the cloud computing environment 950 described below with reference to FIG. 9, and/or with reference to the one or more functional abstraction layers (e.g., quantum software and/or the like) described below with reference to FIG. 10, at 1000 to execute one or more operations in accordance with one or more embodiments described herein. For example, cloud computing environment 950 and/or one or more of the functional abstraction layers 1060, 1070, 1080 and/or 1090 can comprise one or more classical computing devices (e.g., classical computer, classical processor, virtual machine, server and/or the like), quantum hardware and/or quantum software (e.g., quantum computing device, quantum computer, quantum processor, quantum circuit simulation software, superconducting circuit and/or the like) that can be employed by one or more embodiments described herein and/or components thereof to execute one or more operations in accordance with one or more embodiments described herein. For instance, one or more embodiments described herein and/or components thereof can employ such one or more classical and/or quantum computing resources to execute one or more classical and/or quantum: mathematical function, calculation and/or equation; computing and/or processing script; algorithm; model (e.g., artificial intelligence (AI) model, machine learning (ML) model and/or like model); and/or another operation in accordance with one or more embodiments described herein.

It is to be understood that although one or more embodiments described herein include a detailed description on cloud computing, implementation of the teachings recited herein are not limited to a cloud computing environment. Rather, one or more embodiments described herein are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand There is a sense of location independence in that the consumer generally has no control or knowledge over the exact location of the provided resources but can specify location at a higher level of abstraction (e.g., country, state or datacenter).

Rapid elasticity: capabilities can be rapidly and elastically provisioned, in some cases automatically, to quickly scale out and rapidly released to quickly scale in. To the consumer, the capabilities available for provisioning can appear to be unlimited and can be purchased in any quantity at any time.

Measured service: cloud systems automatically control and optimize resource use by leveraging a metering capability at some level of abstraction appropriate to the type of service (e.g., storage, processing, bandwidth and active user accounts). Resource usage can be monitored, controlled and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage or individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems or storage, but has control over the deployed applications and possibly application hosting environment configurations.

Infrastructure as a Service (IaaS): the capability provided to the consumer is to provision processing, storage, networks and/or other fundamental computing resources where the consumer can deploy and run arbitrary software, which can include operating systems and applications. The consumer does not manage or control the underlying cloud infrastructure but has control over operating systems, storage, deployed applications and/or possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy and/or compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community or public) that remain unique entities but are bound together by standardized or proprietary technology that enables data and application portability (e.g., cloud bursting for load-balancing among clouds).

A cloud computing environment is service oriented with a focus on statelessness, low coupling, modularity and/or semantic interoperability. At the heart of cloud computing is an infrastructure that includes a network of interconnected nodes.

Moreover, the non-limiting system 100 and/or the example operating environment 800 can be associated with or be included in a data analytics system, a data processing system, a graph analytics system, a graph processing system, a big data system, a social network system, a speech recognition system, an image recognition system, a graphical modeling system, a bioinformatics system, a data compression system, an artificial intelligence system, an authentication system, a syntactic pattern recognition system, a medical system, a health monitoring system, a network system, a computer network system, a communication system, a router system, a server system, a high availability server system (e.g., a Telecom server system), a Web server system, a file server system, a data server system, a disk array system, a powered insertion board system, a cloud-based system or the like. In accordance therewith, non-limiting system 100 and/or example operating environment 800 can be employed to use hardware and/or software to solve problems that are highly technical in nature, that are not abstract and/or that cannot be performed as a set of mental acts by a human.

Figure 9:
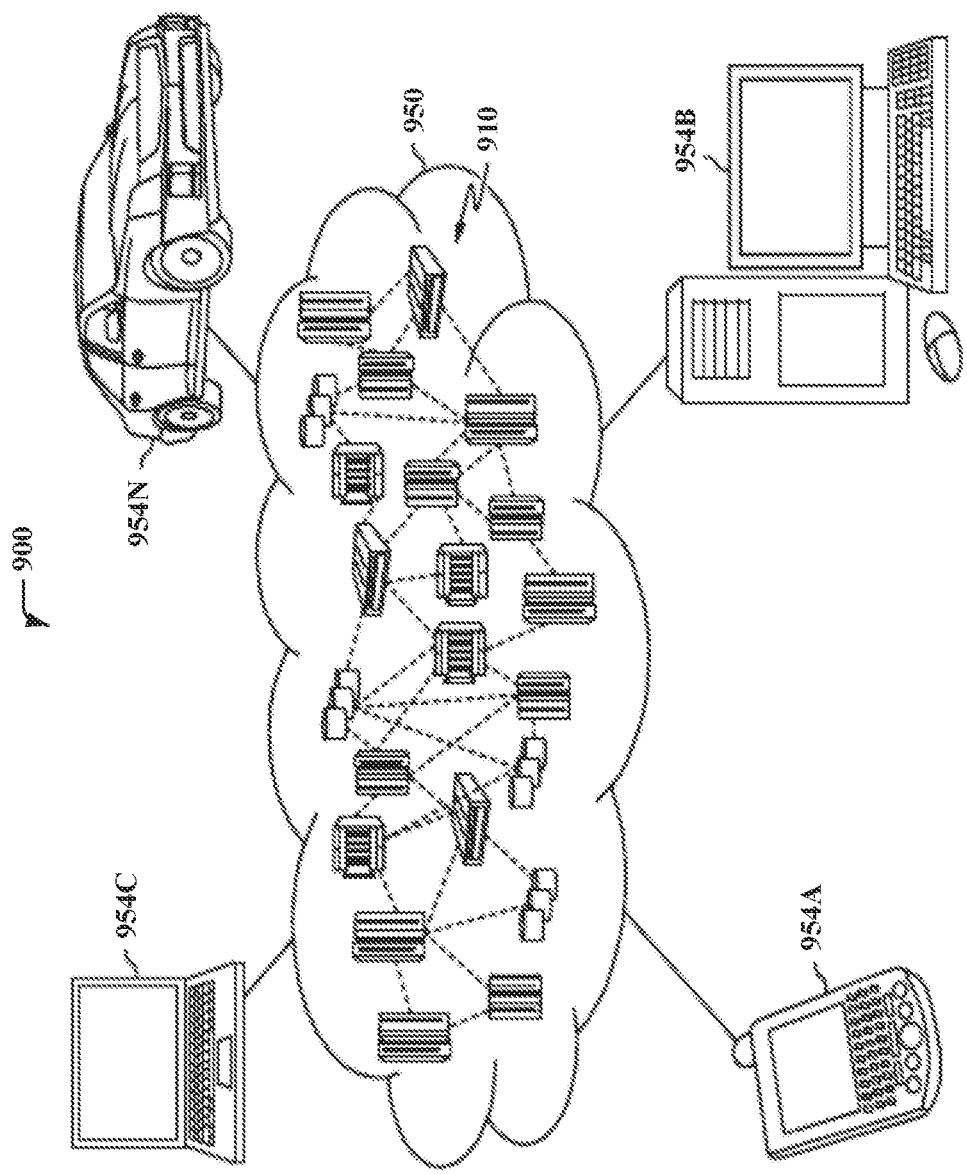
FIG. 9 illustrates a block diagram of an example, non-limiting cloud computing environment in accordance with one or more embodiments described herein.

Referring still to FIG. 9, the illustrative cloud computing environment 950 is depicted. As shown, cloud computing environment 950 includes one or more cloud computing nodes 910 with which local computing devices used by cloud consumers, such as, for example, personal digital assistant (PDA) or cellular telephone 954A, desktop computer 954B, laptop computer 954C and/or automobile computer system 954N can communicate. Although not illustrated in FIG. 9, cloud computing nodes 910 can further comprise a quantum platform (e.g., quantum computer, quantum hardware, quantum software and/or the like) with which local computing devices used by cloud consumers can communicate. Cloud computing nodes 910 can communicate with one another. They can be grouped (not shown) physically or virtually, in one or more networks, such as Private, Community, Public, or Hybrid clouds as described hereinabove, or a combination thereof. This allows cloud computing environment 950 to offer infrastructure, platforms and/or software as services for which a cloud consumer does not need to maintain resources on a local computing device. It is understood that the types of computing devices 954A-N shown in FIG. 9 are intended to be illustrative only and that cloud computing nodes 910 and cloud computing environment 950 can communicate with any type of computerized device over any type of network and/or network addressable connection (e.g., using a web browser).

Figure 10:
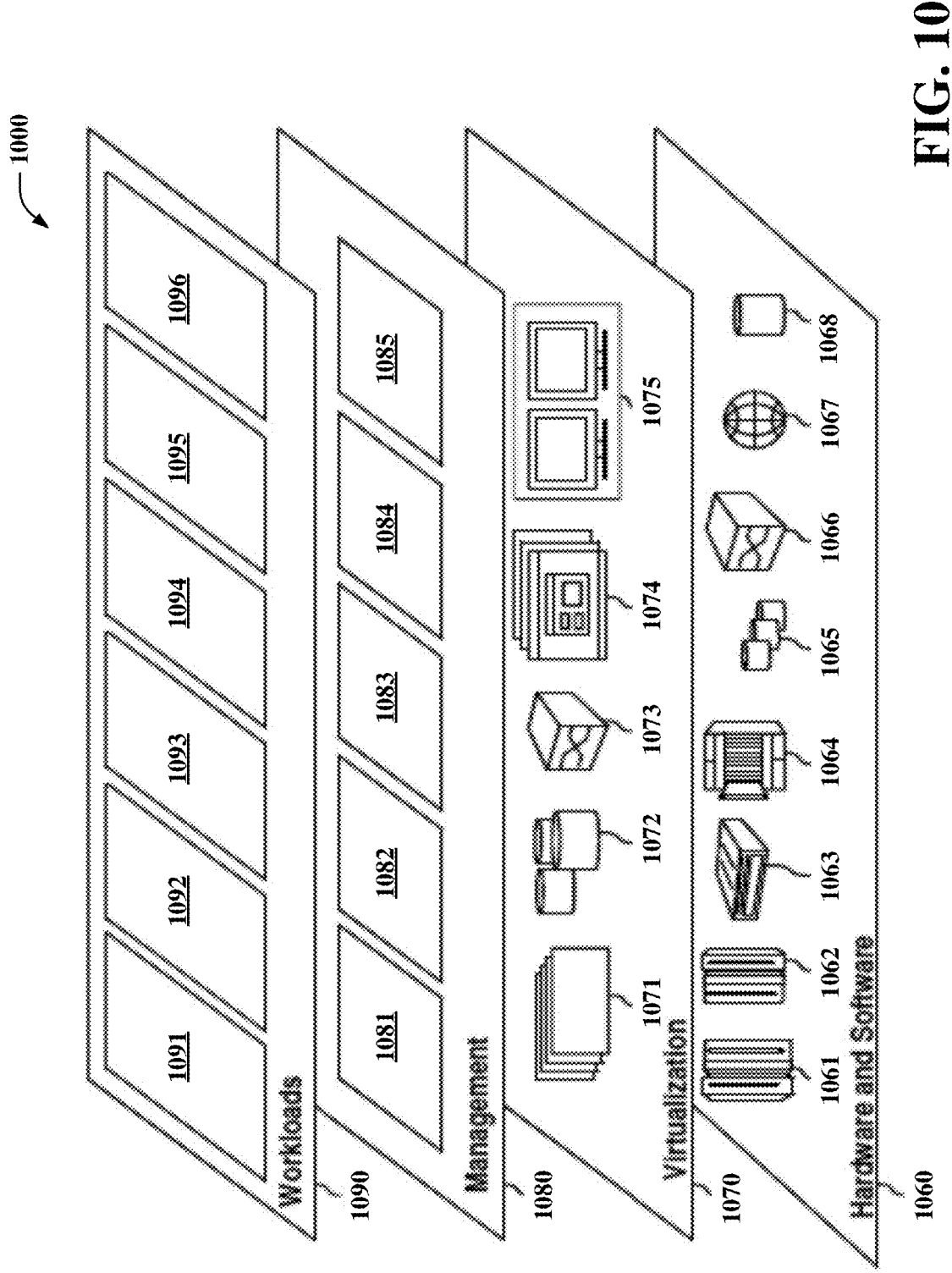
FIG. 10 illustrates a block diagram of a plurality of example, non-limiting abstraction model layers, in accordance with one or more embodiments described herein.

Referring now to FIG. 10, a set of functional abstraction layers is shown, such as provided by cloud computing environment 950 (FIG. 9). One or more embodiments described herein can be associated with one or more functional abstraction layers described below with reference to FIG. 10 (e.g., hardware and software layer 1060, virtualization layer 1070, management layer 1080 and/or workloads layer 1090). It should be understood in advance that the components, layers and functions shown in FIG. 10 are intended to be illustrative only and embodiments described herein are not limited thereto. As depicted, the following layers and corresponding functions are provided:

Hardware and software layer 1060 can include hardware and software components. Examples of hardware components include: mainframes 1061; RISC (Reduced Instruction Set Computer) architecture-based servers 1062; servers 1063; blade servers 1064; storage devices 1065; and networks and networking components 1066. In one or more embodiments, software components can include network application server software 1067, quantum platform routing software 1068 and/or quantum software (not illustrated in FIG. 10).

Virtualization layer 1070 can provide an abstraction layer from which the following examples of virtual entities can be provided: virtual servers 1071; virtual storage 1072; virtual networks 1073, including virtual private networks; virtual applications and/or operating systems 1074; and/or virtual clients 1075.

In one example, management layer 1080 can provide the functions described below. Resource provisioning 1081 can provide dynamic procurement of computing resources and other resources that can be utilized to perform tasks within the cloud computing environment. Metering and Pricing 1082 can provide cost tracking as resources are utilized within the cloud computing environment, and billing or invoicing for consumption of these resources. In one example, these resources can include application software licenses. Security can provide identity verification for cloud consumers and tasks, as well as protection for data and other resources. User (or entity) portal 1083 can provide access to the cloud computing environment for consumers and system administrators. Service level management 1084 can provide cloud computing resource allocation and management such that required service levels are met. Service Level Agreement (SLA) planning and fulfillment 1085 can provide pre-arrangement for, and procurement of, cloud computing resources for which a future requirement is anticipated in accordance with an SLA.

Workloads layer 1090 can provide examples of functionality for which the cloud computing environment can be utilized. Non-limiting examples of workloads and functions which can be provided from this layer include: mapping and navigation 1091; software development and lifecycle management 1092; virtual classroom education delivery 1093;

data analytics processing 1094; transaction processing 1095; and/or application transformation software 1096.

The embodiments described herein can be directed to one or more of a system, a method, an apparatus and/or a computer program product at any possible technical detail level of integration. The computer program product can include a computer readable storage medium (or media) having computer readable program instructions thereon for causing a processor to carry out aspects of the one or more embodiments described herein. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device and/or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon and/or any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the one or more embodiments described herein can be assembler instructions, instruction-set-architecture (ISA) instructions, machine instructions, machine dependent instructions, microcode, firmware instructions, state-setting data, configuration data for integrated circuitry, and/or source code and/or object code written in any combination of one or more programming languages, including an object oriented programming language such as Smalltalk, C++ or the like, and/or procedural programming languages, such as the "C" programming language and/or similar programming languages. The computer readable program instructions can execute entirely on a computer, partly on a computer, as a stand-alone software package, partly on a computer and/or partly on a remote computer or entirely on the remote computer or server. In the latter scenario, the remote computer can be connected to a computer through any type of network, including a local area network (LAN) or a wide area network (WAN), or the connection can be made to an external computer (for example, through the Internet using an Internet Service Provider). In one or more embodiments, electronic circuitry including, for example, programmable logic circuitry, field-programmable gate arrays (FPGA) and/or programmable logic arrays (PLA) can execute the computer readable program instructions by utilizing state information of the computer readable program instructions to personalize the electronic circuitry, in order to perform aspects of the one or more embodiments described herein.

Aspects of the one or more embodiments described herein are described with reference to flowchart illustrations and/or block diagrams of methods, apparatus (systems), and computer program products according to one or more embodiments described herein. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer and/or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus and/or other device to cause a series of operational acts to be performed on the computer, other programmable apparatus or other device to produce a computer implemented process, such that the instructions which execute on the computer, other programmable apparatus and/or other device implement the functions/acts specified in the flowchart and/or block diagram block or blocks.

The flowcharts and block diagrams in the figures illustrate the architecture, functionality, and operation of possible implementations of systems, computer-implementable methods and/or computer program products according to one or more embodiments described herein. In this regard, each block in the flowchart or block diagrams can represent a module, segment and/or portion of instructions, which comprises one or more executable instructions for implementing the specified logical function(s). In one or more alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that the one or more embodiments herein also can be implemented in combination with other program modules. Generally, program modules include routines, programs, components, data structures and/or the like that perform particular tasks and/or implement particular abstract data types. Moreover, those skilled in the art will appreciate that the inventive computer-implemented methods can be practiced with other computer system configurations, including single-processor or multi-processor computer systems, mini-computing devices, mainframe computers, as well as computers, hand-held computing devices (e.g., PDA, phone), microprocessor-based or programmable consumer or industrial electronics and/or the like. The illustrated aspects can also be practiced in distributed computing environments in which tasks are performed by remote processing devices that are linked through a communications network. However, some, if not all aspects of the one or more embodiments can be practiced on stand-alone computers. In a distributed computing environment, program modules can be located in both local and remote memory storage devices.

As used in this application, the terms "component," "system," "platform," "interface," and/or the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, where the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and/or gates, in order to optimize space usage and/or to enhance performance of related equipment. A processor can be implemented as a combination of computing processing units.

Herein, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory and/or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM) and/or Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing the one or more embodiments, but one of ordinary skill in the art can recognize that many further combinations and permutations of the one or more embodiments are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the one or more embodiments have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
   a memory that stores computer executable components; and
   a processor that executes the computer executable components stored in the memory, wherein the computer executable components comprise:
   a decision component that determines, based upon an uncertainty prediction regarding usability of a defined parameter that has been output from a machine learning model, whether to employ the defined parameter for running a variational quantum algorithm;
   a training component that trains the machine learning model by employing a central data store having data related to the variational quantum algorithm, wherein the training comprises training a machine learning model to be uncertainty aware by basing the machine learning model on a natively uncertainty aware machine learning algorithm; and
   an Ansatz component comprises a set of quantum circuits with one or more free parameters, and approximates a quantum state of interest in which the one or more free parameters take optimal values, wherein the decision component outputs feedback to the Ansatz component to direct the Ansatz component to perform parameter optimization on the one or more free parameters using the defined parameter.

2. The system of claim 1, further comprising:
   a performance component that executes the machine learning model to provide the uncertainty prediction and the defined parameter,
   wherein the defined parameter is a variational parameter for initialization of the variational quantum algorithm.

3. The system of claim 1, further comprising:
   an updating component that updates the central data store with the defined parameter and the associated uncertainty prediction.

4. The system of claim 1, further comprising:
   an aggregation component that enables updating of the central data store with one or more other defined parameters, other associated uncertainty predictions, or a combination thereof, from a plurality of systems being distributed relative to one another.

5. The system of claim 1, further comprising:
   a quantum calculation component that executes the variational quantum algorithm on a quantum device, wherein the variational quantum algorithm employs one or more parameters determined at least in part based on the determination regarding the defined parameter.

6. The system of claim 1, wherein the Ansatz component employs an Ansatz method to optimize a supplementary parameter where the decision component determines that the defined parameter will not be employed by the variational quantum algorithm.

7. A computer-implemented method, comprising:
   determining, by a decision component of a system operatively coupled to a processor, and based upon an uncertainty prediction regarding usability of a defined parameter having been output from a machine learning model, whether to employ the defined parameter for running a variational quantum algorithm;
   training, by the system, the machine learning model by employing, by the system, a central data store having data related to the variational quantum algorithm, wherein the training comprises training a machine learning model to be uncertainty aware by basing the machine learning model on a natively uncertainty aware machine learning algorithm; and
   approximating, by the system, a quantum state of interest in which one or more free parameters take optimal values, wherein the decision component outputs feedback to an Ansatz component to direct the Ansatz component to perform parameter optimization on the one or more free parameters associated with a set of quantum circuits in the Ansatz component using the defined parameter.

8. The computer-implemented method of claim 7, further comprising:
   executing, by the system, the machine learning model to provide the uncertainty prediction and the defined parameter,
   wherein the defined parameter is a variational parameter for initialization of the variational quantum algorithm.

9. The computer-implemented method of claim 7, further comprising:
   updating, by the system, the central data store with the defined parameter and the associated uncertainty prediction.

10. The computer-implemented method of claim 7, further comprising:
    enabling, by the system, updating of the central data store with one or more other defined parameters, other associated uncertainty predictions, or a combination thereof, from a plurality of systems being distributed relative to one another.

11. The computer-implemented method of claim 7, further comprising:
    executing, by the system, the variational quantum algorithm on a quantum device, including
    employing, by the system, one or more parameters, by the variational quantum algorithm, determined at least in part based on the determination regarding the defined parameter.

12. The computer-implemented method of claim 7, further comprising:
    employing, by the system, an Ansatz method to optimize a supplementary parameter where the decision component determines that the defined parameter will not be employed by the variational quantum algorithm.

13. The computer-implemented method of claim 7, wherein the training the machine learning model to be uncertainty aware is by basing the machine learning model on a natively uncertainty aware machine learning algorithm such as a Gaussian process or a Bayesian neural network.

14. A computer program product facilitating a process providing a defined parameter and determining whether to employ the defined parameter for a variational quantum algorithm, the computer program product comprising a non-transitory computer readable storage medium having program instructions embodied therewith, the program instructions executable by a processor to cause the processor to:

determine, by the processor, an uncertainty prediction, related to a defined parameter and relative to the variational quantum algorithm;

determine, by a decision component in the processor, and based upon the uncertainty prediction regarding usability of the defined parameter having been output from a machine learning model, whether to employ the defined parameter for running a variational quantum algorithm; and approximate, by the processor, a quantum state of interest in which one or more free parameters take optimal values, wherein the decision component outputs feedback to an Ansatz component to direct the Ansatz component to perform parameter optimization on the one or more free parameters associated with a set of quantum circuits in the Ansatz component using the defined parameter.

15. The computer program product of claim 14, further comprising causing the processor to:

execute, by the processor, the machine learning model to provide the uncertainty prediction and the defined parameter, wherein the defined parameter is a variational parameter for initialization of the variational quantum algorithm.

16. The computer program product of claim 14, further comprising causing the processor to:

train, by the processor, the machine learning model by employing, by the system, a central data store having data related to the variational quantum algorithm.

17. The computer program product of claim 16, further comprising causing the processor to:

update, by the processor, the central data store with the defined parameter and the associated uncertainty prediction.

18. The computer program product of claim 16, further comprising causing the processor to:

enable, by the processor, updating of the central data store with one or more other defined parameters, other associated uncertainty predictions, or a combination thereof, from a plurality of systems being distributed relative to one another.

19. The computer program product of claim 14, further comprising causing the processor to:

execute, by the processor, the variational quantum algorithm on a quantum device, including employing, by the processor, one or more parameters, by the variational quantum algorithm, determined at least in part based on the determination regarding the defined parameter.

* * * * *